(12) United States Patent  
Nejhad et al.

(10) Patent No.: US 8,148,276 B2  
(45) Date of Patent: Apr. 3, 2012

(54) THREE-DIMENSIONALLY REINFORCED MULTIFUNCTIONAL NANOCOMPOSITES

(75) Inventors: Mohammad Naghi Ghasemi Nejhad, Honolulu, HI (US); Vinod P. Veedu, Honolulu, HI (US); Anyuan Cao, Honolulu, HI (US); Pulickel Ajayan, Clifton Park, NY (US); Davood Askari, Honolulu, HI (US)

(73) Assignees: University of Hawaii, Honolulu, HI (US); Rensselaer Polytechnic Institute, Troy, NY (US)

( * ) Notice: Subject to any disclaimer, the term of this patent is extended or adjusted under 35 U.S.C. 154(b) by 931 days.

(21) Appl. No.: 11/523,731

(22) Filed: Sep. 19, 2006

(65) Prior Publication Data

US 2007/0128960 A1    Jun. 7, 2007

Related U.S. Application Data

(60) Provisional application No. 60/740,461, filed on Nov. 28, 2005.

(51) Int. Cl.
| | |
|---|---|
| *B32B 5/02* | (2006.01) |
| *B32B 5/26* | (2006.01) |
| *B32B 11/00* | (2006.01) |
| *B32B 11/02* | (2006.01) |

(52) U.S. Cl. ........ 442/172; 442/178; 442/179; 442/180; 442/239; 977/742; 977/753

(58) Field of Classification Search .......... 442/172–180, 442/239; 977/742, 750, 752, 753  
See application file for complete search history.

(56) References Cited

U.S. PATENT DOCUMENTS

| | | | | |
|---|---|---|---|---|
| 5,332,619 | A | * | 7/1994 | Lacoste et al. ................ 442/127 |
| 5,635,300 | A | * | 6/1997 | Kostikov et al. .............. 428/408 |
| 6,495,258 | B1 | | 12/2002 | Chen et al. |
| 6,716,919 | B2 | | 4/2004 | Lichtenhan et al. |
| 6,734,262 | B2 | | 5/2004 | Patel |
| 6,798,127 | B2 | | 9/2004 | Mao et al. |
| 6,855,202 | B2 | | 2/2005 | Alivisatos et al. |

(Continued)

FOREIGN PATENT DOCUMENTS

EP        1 775 261        4/2007

(Continued)

OTHER PUBLICATIONS

International Search Report and Written Opinion for PCT application PCT/US2006/047483.

(Continued)

*Primary Examiner* — Matthew Matzek  
(74) *Attorney, Agent, or Firm* — Woodcock Washburn LLP

(57) ABSTRACT

A three-dimensional composite reinforcement, a three-dimensionally reinforced multifunctional nanocomposite, and methods of manufacture of each are disclosed. The three dimensional reinforcement comprises a two dimensional fiber cloth upon which carbon nanotubes have been grown, approximately perpendicular to the plane of the fiber cloth. The nanocomposite comprises the three-dimensional reinforcement and a surrounding matrix material. Examples illustrate improvements in the through-thickness mechanical, thermal, and electrical properties of the nanocomposite, in addition to substantial improvements in geometrical stability upon temperature changes and vibrational damping, compared to baseline composites reinforced with the two-dimensional fiber cloth alone. Embodiments of the nanocomposite may also be configured to perform multiple functions simultaneously, such as bearing a thermal or mechanical load simultaneously or bearing a mechanical load while also monitoring the state of damage within the nanocomposite.

20 Claims, 16 Drawing Sheets

U.S. PATENT DOCUMENTS

| | | | |
|---|---|---|---|
| 6,936,653 | B2 | 8/2005 | McElrath et al. |
| 7,001,556 | B1 | 2/2006 | Shambaugh |
| 7,040,948 | B2 | 5/2006 | Mao et al. |
| 7,066,978 | B2 | 6/2006 | Waki et al. |
| 7,067,096 | B2 | 6/2006 | Iijima et al. |
| 7,071,287 | B2 | 7/2006 | Rhine et al. |
| 7,071,406 | B2 | 7/2006 | Smalley et al. |
| 7,537,825 | B1 * | 5/2009 | Wardle et al. ............. 428/292.1 |
| 2002/0052434 | A1 | 5/2002 | Lichtenhan et al. |
| 2003/0145779 | A1 | 8/2003 | Alivisatos et al. |
| 2003/0148042 | A1 | 8/2003 | Wang |
| 2003/0149154 | A1 | 8/2003 | Heinemann et al. |
| 2004/0029706 | A1 | 2/2004 | Barrera et al. |
| 2004/0039096 | A1 | 2/2004 | Patel |
| 2004/0067364 | A1 | 4/2004 | Ishikawa et al. |
| 2004/0070326 | A1 | 4/2004 | Mao et al. |
| 2004/0071870 | A1 * | 4/2004 | Knowles et al. ............. 427/200 |
| 2004/0096388 | A1 | 5/2004 | Ogale et al. |
| 2004/0127621 | A1 | 7/2004 | Drzal et al. |
| 2004/0136894 | A1 | 7/2004 | Yoshizawa et al. |
| 2005/0001528 | A1 | 1/2005 | Mao et al. |
| 2005/0036933 | A1 | 2/2005 | Moy et al. |
| 2005/0040371 | A1 | 2/2005 | Watanabe et al. |
| 2005/0056118 | A1 | 3/2005 | Xia et al. |
| 2005/0084607 | A1 | 4/2005 | Wang |
| 2005/0087726 | A1 | 4/2005 | Anazawa et al. |
| 2005/0109211 | A1 | 5/2005 | Shiraishi et al. |
| 2005/0109269 | A1 | 5/2005 | Alivisatos et al. |
| 2005/0119371 | A1 | 6/2005 | Drzal et al. |
| 2005/0127030 | A1 | 6/2005 | Watanabe et al. |
| 2005/0131163 | A1 | 6/2005 | Rhine et al. |
| 2005/0176329 | A1 * | 8/2005 | Olry et al. ..................... 442/388 |
| 2005/0220730 | A1 | 10/2005 | Malnou et al. |
| 2005/0221085 | A1 | 10/2005 | Lo et al. |
| 2005/0228099 | A1 | 10/2005 | Bringley |
| 2005/0229328 | A1 | 10/2005 | Tran |
| 2006/0029537 | A1 | 2/2006 | Zhang et al. |
| 2006/0051280 | A1 | 3/2006 | Moy et al. |
| 2006/0054866 | A1 | 3/2006 | Ait-Haddou et al. |
| 2006/0058443 | A1 | 3/2006 | Ohashi et al. |
| 2006/0111501 | A1 | 5/2006 | Cont et al. |
| 2006/0148965 | A1 | 7/2006 | Drzal et al. |
| 2006/0148966 | A1 | 7/2006 | Drzal et al. |
| 2006/0154063 | A1 | 7/2006 | Fujihara et al. |
| 2006/0166003 | A1 | 7/2006 | Khabashesku et al. |

FOREIGN PATENT DOCUMENTS

| | | |
|---|---|---|
| JP | 09-067946 | 11/1997 |
| WO | WO 03/020226 | 3/2003 |
| WO | WO 2004/025003 | 3/2004 |
| WO | WO 2005/075341 | 8/2005 |
| WO | WO 2008/065446 | 6/2008 |

OTHER PUBLICATIONS

Adams, D. F., Carlsson, L. A., and Pipes, R.B., *Experimental Characterization of Advanced Composite Materials*, 3rd Edition, CRC Press, Boca Raton, FL, 2003.

Askari, D., Veedu, V. P., Ghasemi-Nejhad, M. N., "Chirality Dependence of Carbon Single-Walled Nanotube Material Properties: Axial Coefficient of Thermal Expansion" *Journal of Nanoscience and Technology*, vol. 6, 2167-2174, 2006.

Cao, A. et al., "Multifunctional brushes made from carbon nanotubes", *Nature Mater.*, 4, 540-545., 2005.

Cao, A. et al., Super-Compressible Foamlike Carbon Nanotube Films, *Science*, 310, 1307-1310., 2005.

Ajayan, P.M., Schadler, L.S., and Braun, P.V., *Nanocomposite Sci. & Tech.*, Wiley-VCH, Weinheim, , 2003.

Andrews, R. et al., "Continuous production of aligned carbon nanotubes: a step closer to commercial realization", *Chem. Phys. Lett.*, 303, 467-474, 1999.

Baughman, R. H., Zakhidov, A. A., and de Heer, W. A. "Carbon Nanotubes—the Route Toward Applications", *Science*, 297, 787-792, 2002.

Biercuk, M.J., et al. "Carbon nanotube composites for thermal management", *Appl. Phys. Lett.*, 80, 2767-2769., 2002.

Cao, A., Ajayan, P.M., Ramanath, G., Baskaran, R. and Turner, K., "Silicon Oxide Thickness-Dependent Growth of Carbon Nanotubes", *Appl. Phys. Lett*, 84,109-111., 2004.

Carlsson, L. A. and Pipes, R. B., *Experimental Characterization of Advanced Composite Materials*, $2^{nd}$ Edition, Technomic Publishing Co., Inc., Lancaster, PA , 1997.

Davies, P., Cantwell, W., and Kausch, H.H., "Measurement of Initiation Values of $G_{IC}$ in IM6/PEEK Composites", *Composites Science and Technology*, 35, 301-313., 1989.

Dexter, H. B. and Funk, J. G., "Impact Resistance and Interlaminar Fracture Toughness of Through-the-Thickness Reinforced Graphite/Epoxy", San Antonio, Texas, $27^{th}$ AIAA Structural Dynamics and Materials Conference, AIAA Paper 86-1020, 700-709., 1986.

Dow, M. B. and Dexter, H. B., "Development of Stitched, Braided and Woven Composite Structures in the ACT Program and at Langley Research Center (1985 to 1997)", NASA/TP-97-206234, 1997.

Dresselhaus, M.S., Dresselhaus, G., and Eklund, P.C., *Science of Fullerenes and Carbon Nanotubes*, Academic Press, San Diego, 1996.

Drzal, L. T. and Madhukar, M., "Fibre-matrix adhesion and its relationship to composite mechanical properties", *J. Mater. Sci.*, 28, 569-610., 1993.

Ebbesen, T.W. et al., "Electrical conductivity of individual carbon nanotubes", *Nature* 382, 54-56., 1996.

Ghasemi-Nejhad, M. N., Bayliss, J. K. and Yousefpour, A., "Processing and Performance of Continuous Fiber Ceramic Composites by Preceramic Polymer Pyrolysis: II—Resin Transfer Molding", *J. Composite Mat.* 35, 2239-2255., 2001.

Ghasemi-Nejhad, M. N., Chandramouli, M. V. and Yousefpour, A., "Processing and Performance of Continuous Fiber Ceramic Composites by Preceramic Polymer Pyrolysis: I—Filament Winding", *J. Composite Mat.*. 35, 2207-2237.

Gudapati, V. M., Veedu, V. P., and Ghasemi-Nejhad, M. N., "Polymeric precursor pyrolysis for flexural property evaluation of continuous fiber ceramic nanocomposites with nanoparticles", *Composites Sci. and Tech.* 66, 3230-3240., 2006.

Haggenmueller, R., Gommans, H.H., Rinzler, A.G., Fischer, J.E., and Winey, K.I., "Aligned single-wall carbon nanotubes in composites by melt processing methods", *Chem. Phys. Lett.* 330, 219-225., 2000.

Huang, H., Liu, C., Wu, Y.; and Fan, S., "Aligned Carbon Nanotube Composite Films for Thermal Management", *Adv. Mater.* 17, 1652-1656., 2005.

International Preliminary Report on Patentability for corresponding application PCT/US2006/045418, Sep. 18, 2008.

International Search Report and Written Opinion, PCT/US2005/045418, dated Feb. 23, 2005 in 9 pages.

Kalamkarov, A. L., Askari, D., Veedu, V. P., and Ghasemi-Nejhad, M. N., "Generally Cylindrical Orthotropic Constitutive Properties Modeling of Matrix-filled Single-walled Nanotubes: Axial Mechanical Properties", *J. Comp. Mater.* 41-6, 757-779., 2007.

Kalamkarov, A. L., Veedu, V. P., and Ghasemi-Nejhad, M. N., "Mechanical Properties Modeling of Carbon Single-Walled Nanotubes: An Asymptotic Homogenization Method", *J. Comput. Theo. Nanosc.* 2-1, 124-131., 2005.

Koratkar, N., Wei, B., and Ajayan, P.M., "Carbon Nanotube Films for Damping Applications", *Adv. Mater.*, 14, 997-1000., 2002.

Mallick, P.K., *Fiber-Reinforced Composites, Materials, Manufacturing, and Design*, $2^{nd}$ Ed. Revised, Marcel Dekker, NY, 1993.

Martin, R.H., "Effect of Initial Delamination on $C_{IC}$ and $G_{Ith}$ Values from Glass/Epoxy Double Cantilever Beam Tests", Proceedings of the American Society for Composites, Third Technical Conference, Seattle, Washington, 688-701., 1988.

Mazumdar, S.K., *Composites Manufacturing: Materials, Product, and Process Engineering*, CRC Press, Boca Raton, USA, 2002.

Mouritz, A.P., "Fracture and tensile fatigue properties of stitched fibreglass composites", *Journal of Materials: Journal of Materials Design and Applications*, 218-2, 87-93., 2004.

Overney, G., Zhong, W., and Tománek, D., "Structural rigidity and low frequency vibrational modes of long carbon tubules", *Z. Phys. D* 27, 93-96., 1993.

Qian, D., Wagner, G.J., Liu, W.K, Yu, M.F. and Ruoff, R.S., "Mechanics of carbon nanotubes", *Appl., Mech. Rev.* 55, 495-515., 2002.

Suhr, J., Koratkar, N., Keblinski, P., and Ajayan, P., "Viscoelasticity in carbon nanotube composites", *Nature Mater.* 4, 134-137., 2005.

Tai, N.H., Yeh, M.K. and Liu, J.H., "Enhancement of the mechanical properties of carbon nanotube/phenolic composites using a carbon nanotube network as the reinforcement", *Carbon*, 42, 774-7, 2004.

Thostenson, E.T., Li, C. and Chou, T.W., "Nanocomposites in context", *Composites Sci. and Tech.*, 65, 491-516., 2005.

Thostenson, E.T., Ren, Z.F., and Chou, T.W., "Advances in the science and technology of carbon nanotubes and their composites: a review", *Compos. Sci. &. Techn.* 61, 1899-1912., 2001.

Treacy, M.M.J., Ebbesen, T.W., and Gibson J.M., "Exceptionally high Young's modulus observed for individual carbon nanotubes", *Nature* 381, 678-680., 1996.

Veedu, V.P., Askari, D., and Ghasemi-Nejhad, M.N., "Chirality Dependence of Carbon Single-Walled Nanotube Material Properties: Axial Young's Modulus". *Nanosci. & Nanotech.* 6, 2159-2166., 2006.

Yu, M.F., "Fundamental Mechanical Properties of Carbon Nanotubes: Current Understanding and the Related Experimental Studies", *J. Engg. Mater. & Tech.* 126, 271-278., 2004.

Ghasemi-Nejhad, M.N. and Askari, D. "Mechanical Properties Modeling of Carbon Single-Walled Nanotubes: A Finite Element Method," *J. Comput. and Theor. Nanosci.*, 2005, vol. 2, pp. 298-318.

Meirovitch, L., *Analytical Methods in Vibration*, 1967.

Examination report from corresponding European Patent Appl. No. 06851923.0-2124, Oct. 24, 2008.

Calvert, P., "Nanotube composites: a recipe for strength", *Nature*, 1999, vol. 399, pp. 210-211.

Chaudhuri, J., and Jang, Q., "The Effect of Special Orientation on the Fracture Behavior of Graphite/Epoxy Laminates", Third Technical Conference (Integrated Composites Technology), Seattle, WA, 1988.

Kwon, Y-K., Berber, S. & Tomanek, D., "Thermal contraction of carbon fullerenes and nanotubes", *Phys. Rev. Lett.*, 2004, vol. 92, pp. 015901-1-015901-4.

Lopez, L., Song, B.M.K., and Hahn, H.T., "The Effect of Particle Size in Alumina Nanocomposites", Proceedings of the 14th International Conference on Composite Materials, San Diego, 2003.

Prel, Y.J., Davies, P., Benzeggagh, M.L. & de Charentenay, F., *Composite Materials: Fatigue and Fracture, Proc. 2nd Symp.* (Cincinnati, Ohio), vol. 2, 251-269, American Society for Testing and Materials, Philadelphia, PA, 1989.

Ruoff, R.S. & Lorents, D.C., "Mechanical and thermal properties of carbon nanotubes", *Carbon*, 1995, vol. 33, pp. 925-930.

Simonite, Tom, "Nanotube 'forest' makes super slippery surface", www.newscientist.com/article/dn10077, Sep. 14, 2006.

Thostenson et al., "Carbon nanotube/carbon fiber hybrid multiscale composites", *Journal of Applied Physics*, May 1, 2002, vol. 91, Issue 9, pp. 6034-6037, New York, US.

Tong, L., Mauritz, A.P. & Bannister, M., "3D Fibre Reinforced Polymer Composites", Elsevier Science, Oxford, 2002.

Veedu et al., "Multifunctional composites using reinforced laminae with carbon-nanotube forests", Nature Materials, Jun. 2006, pp. 457-462.

Yu, M.F. et al., "Strength and breaking mechanism of multiwalled carbon nanotubes under tensile load", *Science*, 2000, vol. 287, Issue 637-640.

Zhang, M., Atkinson, K.R. & Baughman, R.H., "Multifunctional carbon nanotube yarns by downsizing an ancient technology", *Science*, 2004, vol. 306, pp. 1358-1361.

Zhou, X., Shin, E., Wang, K.W. & Bakis, C.E., "Interfacial damping characteristics of carbon nanotube-based composites", *Compos. Sci. Technol.*, 2004, vol. 64, pp. 2425-2437.

\* cited by examiner

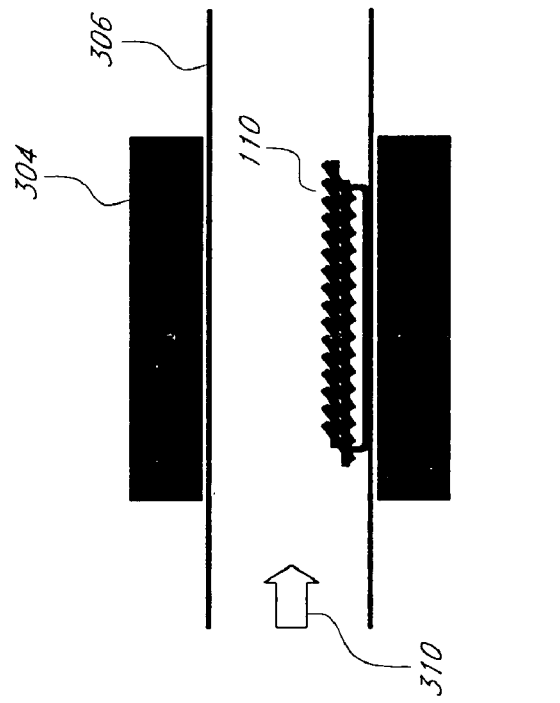
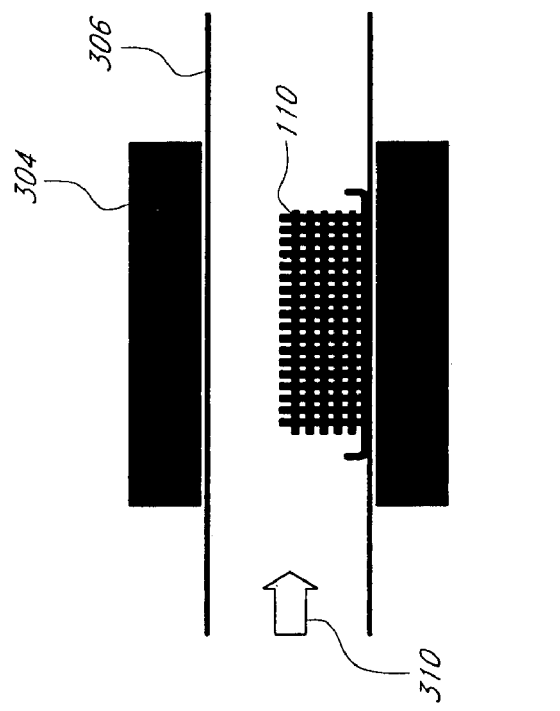
FIG. 3

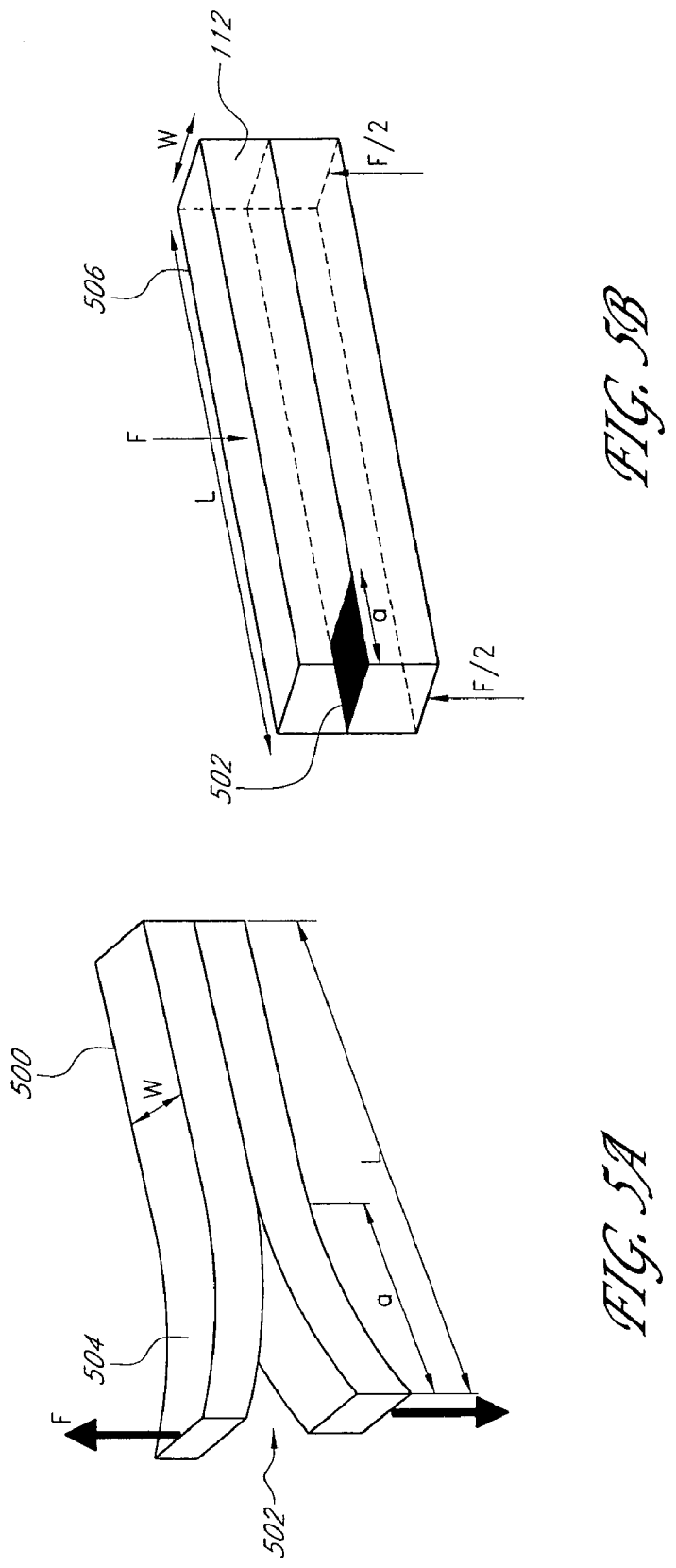

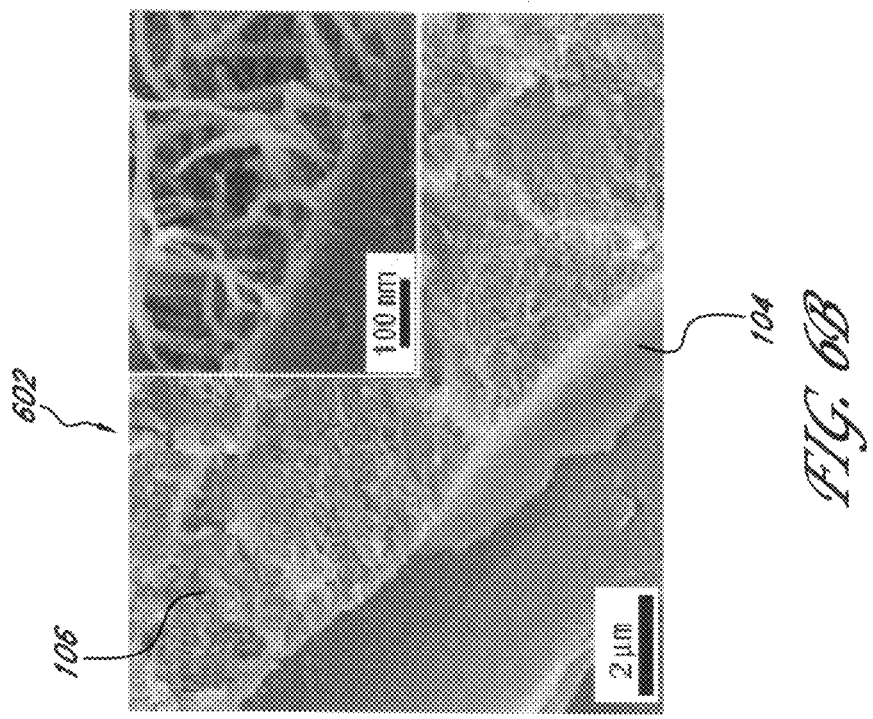
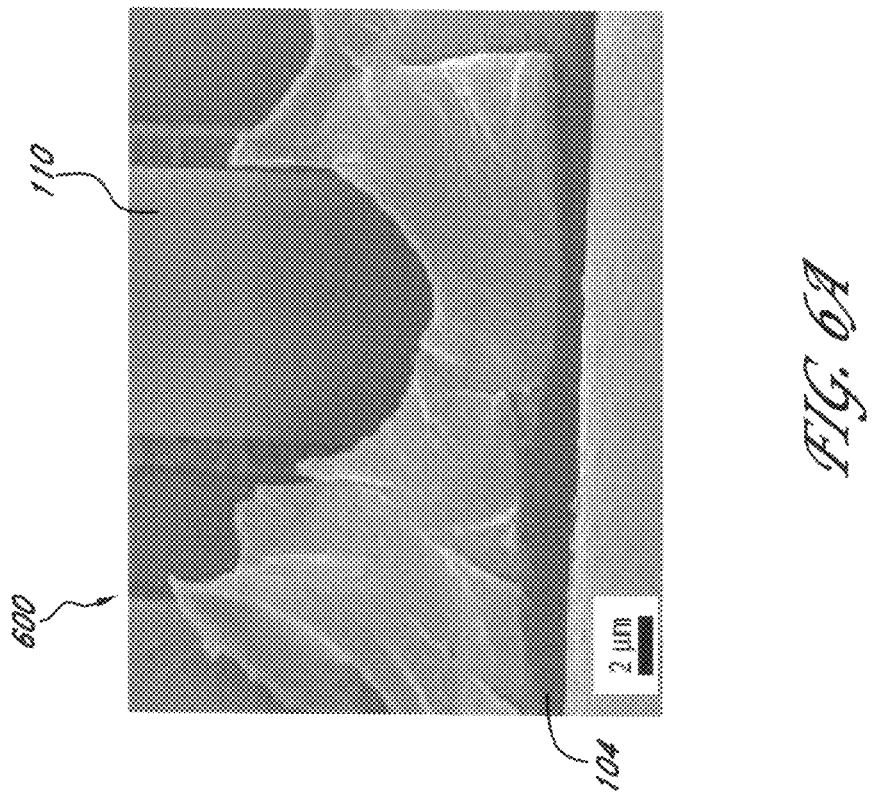
FIG. 6A
FIG. 6B
FIG. 6

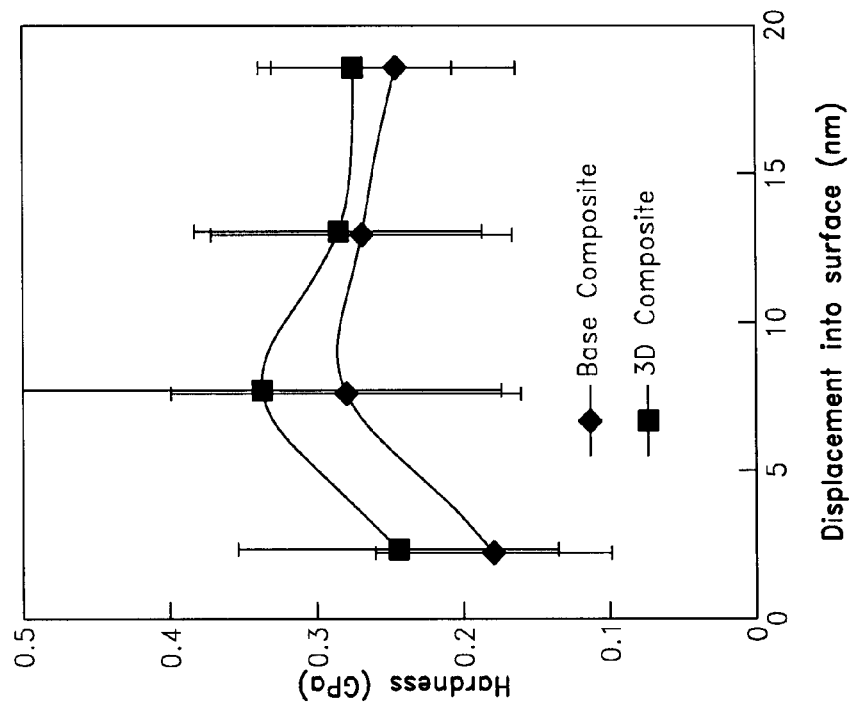
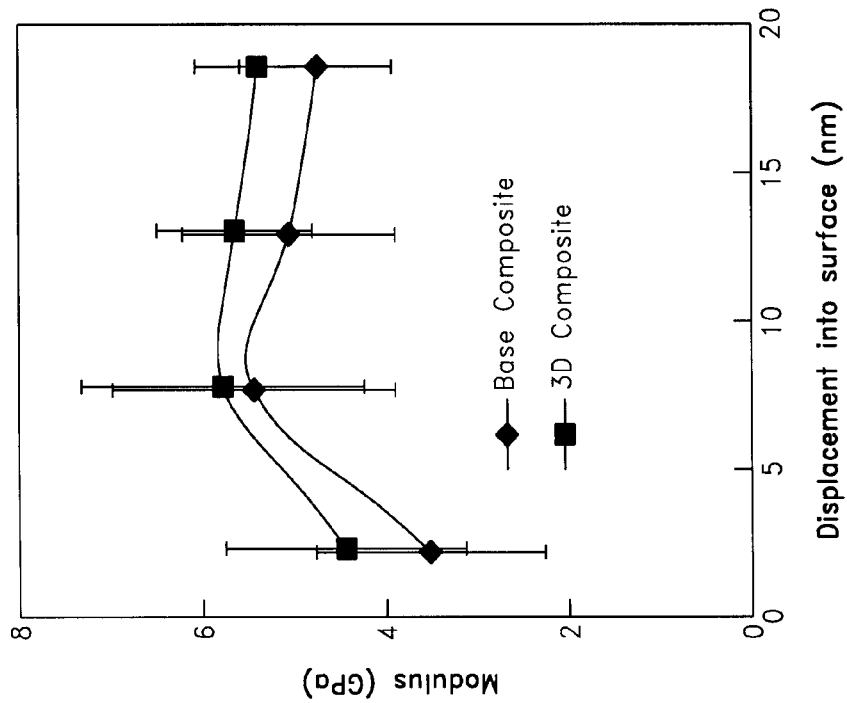
FIG. 7A
FIG. 7B
FIG. 7

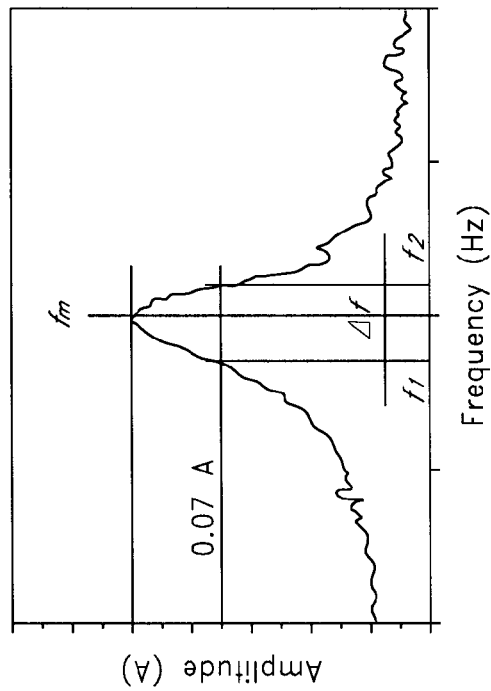
FIG. 8B
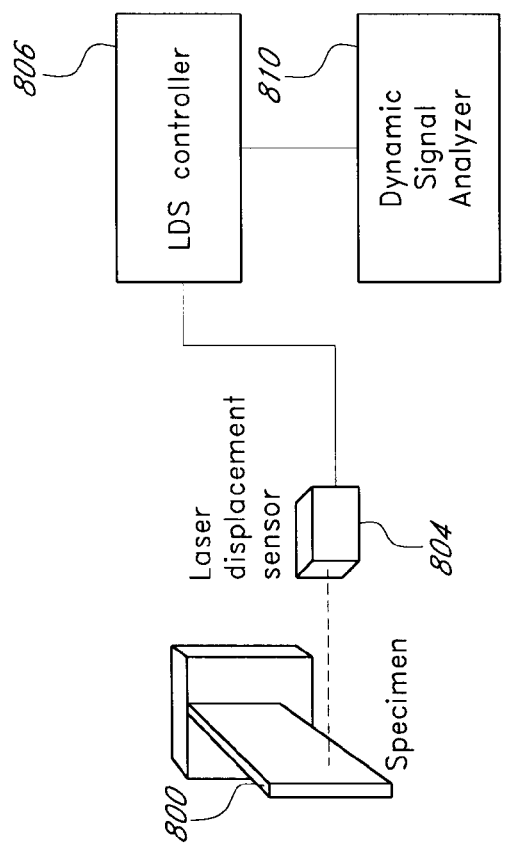
FIG. 8A
FIG. 8

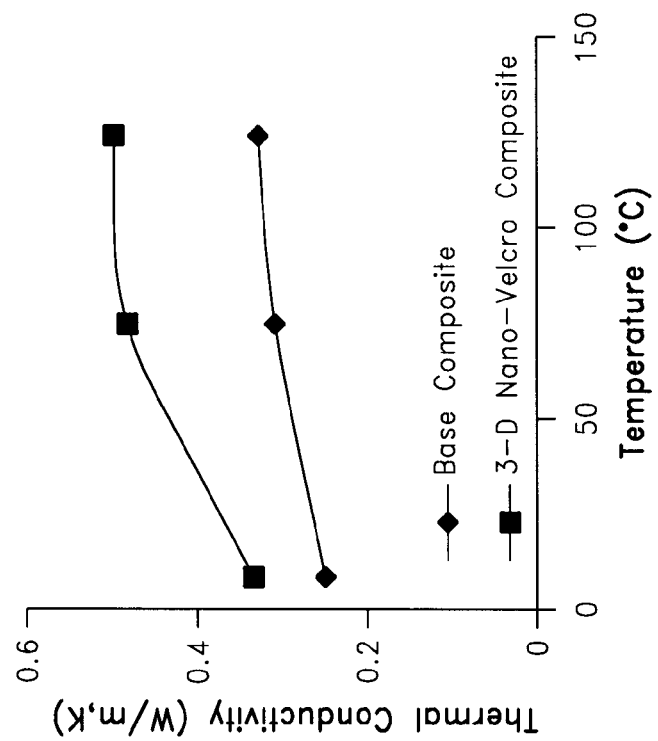
FIG. 9B
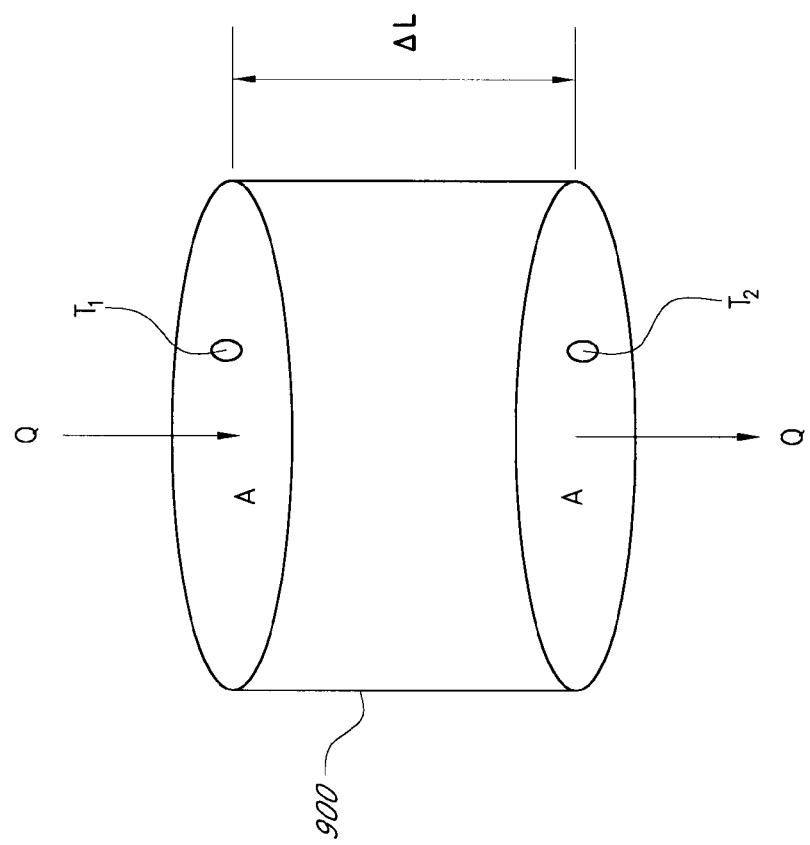
FIG. 9A
FIG. 9

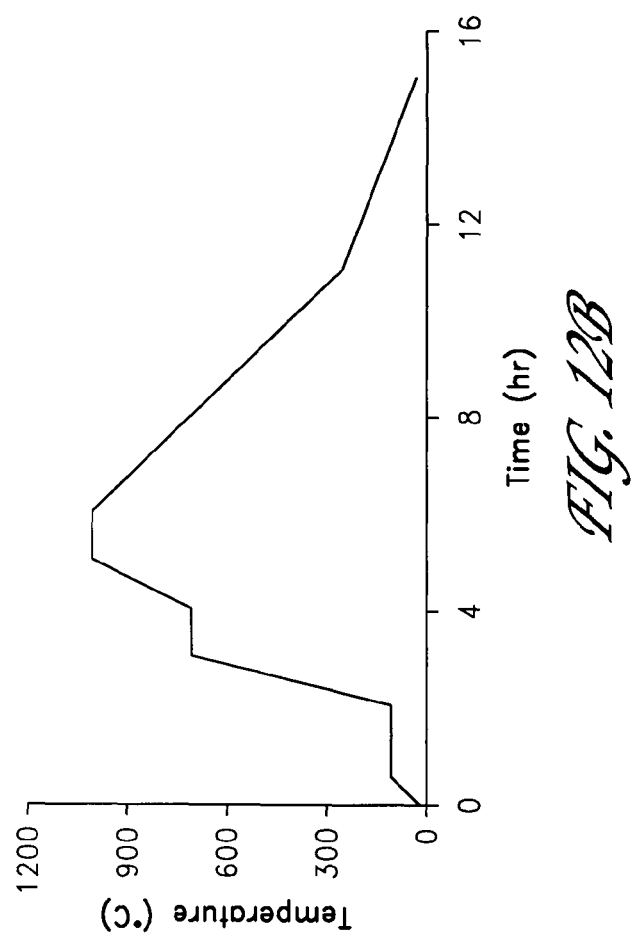
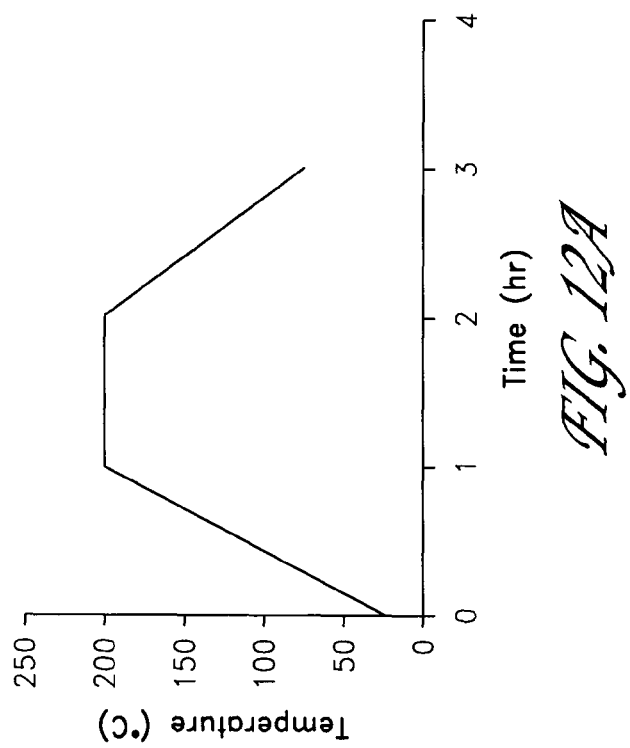
FIG. 12A
FIG. 12B

THREE-DIMENSIONALLY REINFORCED MULTIFUNCTIONAL NANOCOMPOSITES

CROSS-REFERENCE TO RELATED APPLICATIONS

This application claims the benefit of priority under 35 U.S.C. §119(e) of U.S. Provisional Application No. 60/740,461 filed on Nov. 28, 2005, the entirety of which is incorporated herein by reference.

STATEMENT REGARDING FEDERALLY SPONSORED R&D

This invention was made with Government support under Contract Numbers N00014-00-1-0692 and N00014-05-1-05086 awarded by ONR (Office of Naval Research) and Contract Number NSEC0117792 awarded by NSF (National Science Foundation). The Government has certain rights in this invention.

PARTIES OF JOINT RESEARCH AGREEMENT

This invention was made as a result of activities undertaken within the scope of a joint research agreement between the University of Hawaii and Rensselaer Polytechnic Institute.

BACKGROUND OF THE INVENTION

1. Field of the Invention

Certain embodiments of the present invention relate to composite materials and, in particular, woven fiber composites reinforced through-the-thickness with carbon nanotubes.

2. Description of the Related Art

Composite materials have been developed to meet increasing demands for materials possessing a broad array of desirable properties. Composites are material systems which combine two or more distinct materials, each with its own distinctive, desirable properties, to create a new material with properties that may not be present, or to the same extent, in the components alone. Composite materials, broadly, possess at least two phases—a reinforcement and a matrix. The reinforcement is a material which is embedded within the matrix. In general, the reinforcing material and the matrix material comprise any combination of metals, ceramics, or polymers. The utility and versatility of composites has resulted in their use within a wide variety of applications, ranging from aircraft and marine structural components to sporting goods.

Significant research has been directed to composite materials which are reinforced in one- and two-dimensions (1-D, 2-D). 1-D and 2-D continuous-fiber reinforced composites (CFRCs) employ long fibers which substantially span the length and/or width of the composite material. In certain CFRCs, these fibers may take the form of unidirectional tapes or fiber cloths, where small diameter filaments are woven to form cloths having fibers which extend in predetermined orientations, such as 0°/90° and ±45°. This allows the composite to be constructed for a specific loading condition, placing the relatively strong fibers in a position where they carry the majority of the applied stress.

However, an inherent weakness of 1-D and 2-D CFRCs is their interlaminar and intralaminar properties. Interlaminar and intralaminar refers to processes which happen between or within planes of the fibers, which are generally stacked through the thickness of the composite. As 1-D and 2-D CFRCs lack reinforcement out of the plane of the fibers, they possess little resistance to out of plane deformation. As a result, these CFRCs possess low interlaminar fracture toughness, and interlaminar failure, such as delamination, may occur at relatively low levels of applied stress under various loading conditions.

To mitigate this weakness, 3-D composite architectures, with fibers running both in 2-D in-plane and orthogonal to the fiber plane, have been explored. However, attempts to develop these 3-D reinforced composites employing braided or through-the-thickness stitched fibers have met with mixed success. Investigations of composite laminates with 3-D braided reinforcements have found improvements in damage tolerance but also determined that the braided reinforcement and the non-normal orientation of the braided fiber with the 2-D in-plane fiber results in low in-plane strengths. The low in-plane strengths limit the applicability of the 3-D braided composites to specific applications and geometries. In the case of stitching, the out-of-plane reinforcing fibers can be orthogonal to the 2-D reinforcing fibers; however, the in-plane mechanical performance of the stitched composites depend critically on the stitch pattern. In practice, stitching has been found to shorten the tensile fatigue life of the composite and stitched laminates are reported to have tension and compression strengths of approximately 20-25 percent lower than the strengths of unstitched laminates.

To address these deficiencies, composite systems employing carbon nanotubes as a through-thickness reinforcement are now being developed. Carbon nanotubes (CNTs) are quasi-one dimensional, nearly single crystalline (axially), hollow, graphitic carbon structures. Their combination of high aspect ratio, small size, and excellent mechanical properties, coupled with low density, and high electrical conductivity make these materials good candidates as reinforcements in 3-D reinforced composites. Different researchers have reported significant improvements in the in-plane mechanical properties of carbon nanotubes (CNTs) reinforced nanocomposites compared to the unreinforced counterparts. However, lack of control of the orientation of the nanotubes and their dispersion is still a major challenge and indeed restricts their usage in structural applications These deficiencies in the design of current 3-D reinforced composites illustrate the need for improved systems and methods for through-thickness reinforcement of 2-D continuous-fiber reinforced composites, and other improvements discussed below.

SUMMARY OF THE INVENTION

One embodiment of the present invention provides a three-dimensionally reinforced composite laminate. The laminate comprises a matrix, such as selected from polymers and ceramics, and a reinforcement positioned substantially within the matrix comprising a woven fiber cloth and carbon nanotubes which are connected to the woven fiber, extending outward from the surface defined by the woven cloth.

Another embodiment comprises a fabric reinforcement and a method of manufacturing the same comprising a woven fiber cloth and carbon nanotubes connected to the woven fiber cloth. The nanotubes extend generally perpendicular to the woven fiber cloth. A plurality of such fabric reinforcements may be joined together to provide an improved reinforcement structure.

In another embodiment, a method of fabricating a three-dimensionally reinforced composite laminate is provided. In a first step, the method comprises providing a two-dimensional woven fiber cloth. In a second step, the method comprises growing carbon nanotubes on a surface of the woven fiber cloth, such as by chemical vapor deposition of a nanotube precursor solution on the surface of the woven fiber cloth, so as to form a three-dimensional fiber preform. In a third step, the method comprises substantially infiltrating the three-dimensional fiber preform with a matrix material to form a three-dimensional composite lamina. In a fourth step, the method comprises assembling a plurality of three-dimensional composite laminae such that the nanotubes are substantially positioned between the laminae. In a fifth step, the method comprises curing the assembled laminae at a predetermined temperature.

One embodiment of the invention relates to growth of carbon nanotubes on SiC fibers and woven fiber cloths. Another embodiment relates to growth of carbon nanotubes on non-SiC fibers and woven fiber cloths, for example, carbon or glass fibers and fiber cloths. In this embodiment, a SiC coating is applied to the non-SiC fiber or fiber cloths. Carbon nanotubes may be grown on the SiC coating. Accordingly, embodiments of the invention relate to fabric reinforcements wherein a woven fiber cloth comprises SiC at least at a surface of the cloth.

BRIEF DESCRIPTION OF THE DRAWINGS

These and other objects and advantages will become more apparent from the following description taken in conjunction with the accompanying drawings.

FIGS. 3A-B are two embodiments of orientations a 2-D fiber cloth may adopt when used as a substrate upon which carbon nanotubes are grown;

FIGS. 5A-D are schematic illustrations of embodiments of mechanical test specimens for measurement of interlaminar fracture toughness and corresponding testing results of embodiments of the 2-D baseline and 3-D nanocomposites illustrating the improvement in interlaminar fracture toughness with through-thickness reinforcement of carbon nanotubes; (A) Double cantilever beam (DCB) test for Mode I fracture toughness; (B) End notched flexure test for Mode II fracture toughness; (C) Load-deflection response of (A); (D) Load-deflection response of (B);

FIGS. 6A-B are scanning electron micrographs of fracture surfaces of embodiments of the 2-D baseline composites (FIG. 6A) and 3-D nanocomposites (FIG. 6B) illustrating the difference in appearance of the fracture surface upon inclusion of the carbon nanotube reinforcement through the thickness into the 3-D nanocomposite;

FIGS. 7A-B are in-plane modulus (FIG. 7A) and hardness (FIG. 7B) values of embodiments of the 2-D baseline and 3-D nanocomposites illustrating the improvement in these properties with through-thickness reinforcement of carbon nanotubes;

FIGS. 8A-B present the test configuration (FIG. 8A) and exemplifying data (FIG. 8B) for mechanical damping tests;

FIGS. 9A-B present the test configuration (FIG. 9A) and experimental measurements of through-thickness thermal conductivity as a function of temperature (FIG. 9B) for embodiments of the 2-D baseline and 3-D nanocomposites illustrating the improvement in through-thickness thermal conductivity with through-thickness reinforcement of carbon nanotubes;

FIGS. 12A-B illustrate embodiments of heating schedules for curing (A) and pyrolysis (B) of pre-ceramic polymers utilized to deposit SiC on non-SiC fiber cloths.

DETAILED DESCRIPTION OF THE PREFERRED EMBODIMENTS

Figure 1:
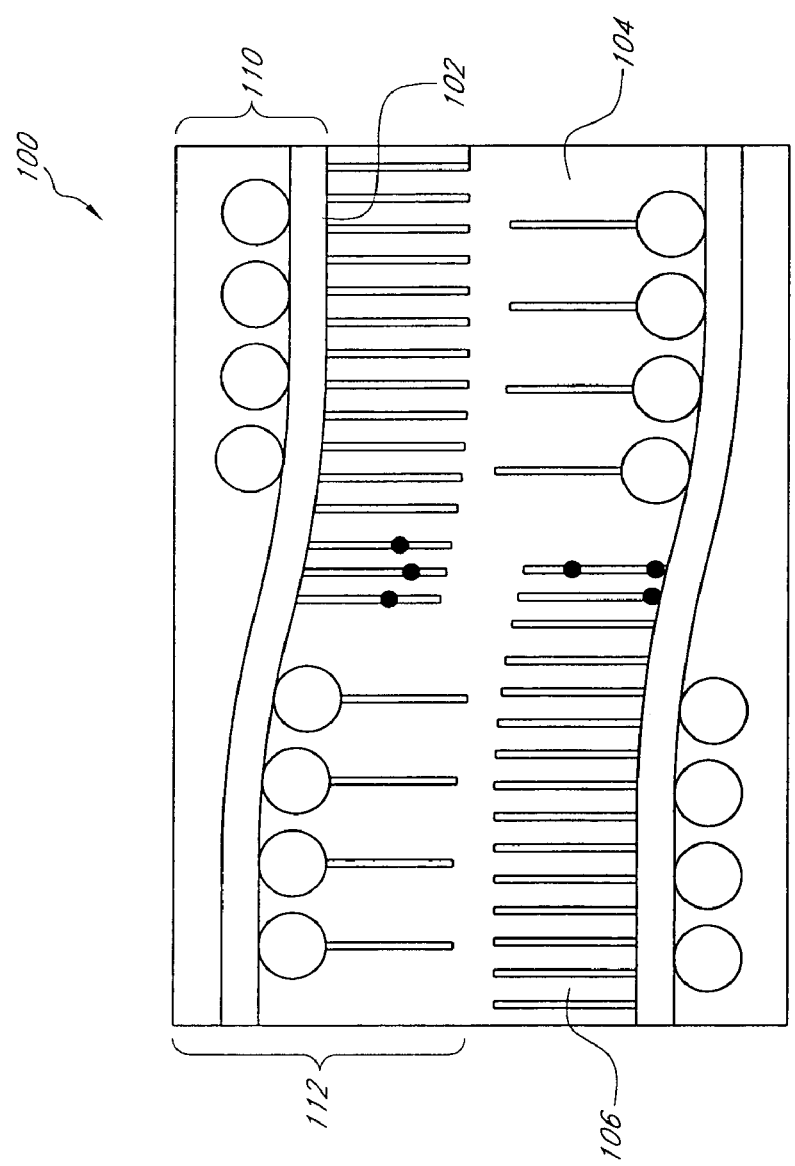
FIG. 1 is one embodiment of a 3-D nanocomposite laminate.
Figure 2:
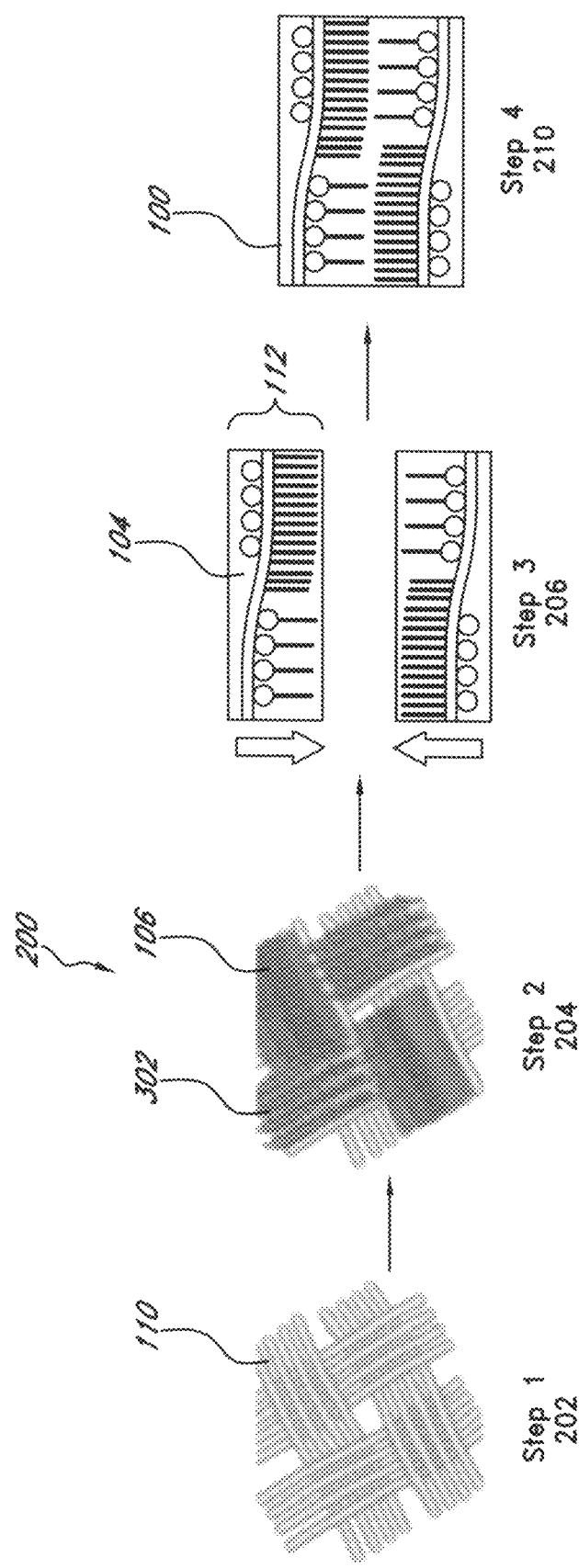
FIGS. 2A-2D are schematic illustrations of one embodiment of a method of manufacturing the 3-D nanocomposite laminate of FIG. 1.

Reference will now be made to the drawings wherein like numerals refer to like parts throughout. FIG. 1 illustrates one embodiment of a laminated 3-D nanocomposite 100. The 3-D nanocomposite 100 comprises a reinforcing 3-D reinforcement 102 and a surrounding matrix 104.

In one embodiment, the 3-D reinforcement 102 comprises carbon nanotubes (CNTs) 106 oriented approximately perpendicular to, and interconnected with 2-D woven fiber cloths 110. As will be discussed in greater detail below, at least a portion of the through-thickness nanotubes 106 on adjacent lamina 112 are mechanically interlocked, providing improved delamination resistance to the nanocomposite 100. The unique properties of the nanotubes 106 also provide through-thickness properties to the 3-D nanocomposite 100, including electrical and thermal conductivity, thermal expansion, and mechanical damping, which are improved over comparable 2-D reinforced composites. Advantageously, the improvements in properties provided by the 3-D reinforcement, and the through-thickness nanotubes 106 in particular, allow the 3-D nanocomposites 100 to perform multiple functions simultaneously, such as supporting a thermal and mechanical loads through the nanocomposite thickness concurrently or supporting a mechanical or thermal loads while utilizing the through thickness conductivity to monitor the state of damage in the nanocomposite 100. These and other advantages of the 3-D continuous-fiber reinforced nanocomposite 100 and 3-D reinforcement 102 will be discussed in greater detail below.

Carbon nanotubes are a relatively new configuration of carbon which has been developed. A single walled carbon nanotube (SWNT) can be conceptualized as wrapping a one-atom-thick layer of graphite called graphene into a seamless cylinder. Most SWNTs have a diameter of close to about 1 nanometer (nm), with a tube length that can be many thousands of times larger. For example, SWNTs with length up to orders of centimeters have been produced. A multiple walled carbon nanotube (MWNT) comprises multiple layers of graphite rolled upon themselves to form a tube shape.

Carbon nanotubes possess a variety of superior properties: mechanical, electrical, and thermal. Progress made in the production and purification of nanotubes in recent years has made it practical to consider nanotubes as reinforcing materials in composite materials. With respect to their mechanical properties, nanotubes exhibit extraordinary strength, on the order of tens of GPa, and elastic modulus, on the order of about 1 TPa. Additionally, nanotubes may undergo plastic deformation at elevated tensile stresses, allowing for some degree of permanent deformation. This deformation begins at strains of approximately 5% and can increase the maximum strain the tube undergoes before fracture. These mechanical properties make CNTs excellent candidates as reinforcing materials. Further, carbon nanotubes possess a relatively low density for a solid, approximately 1.3-1.4 g/cm$^3$. This provides CNTs a specific strength which is very high, also making them very attractive for use in composite materials, which are often utilized in applications where weight is a key design consideration. Nanotubes may also be engineered with high thermal and electrical conductivities. As discussed in greater detail with respect to the examples below, the use of CNTs as a through-thickness reinforcement in conjunction with 2-D fiber reinforcements provides the 3-D nanocomposites 100 with mechanical, thermal, and electrical properties that are superior to their two-dimensionally reinforced counterparts.

In one embodiment, a method 200 of manufacturing the 3-D reinforcement and 3D-nanocomposite 100 is schematically illustrated in FIGS. 2A-2D. In a first step 202, a 2-D fiber cloth 110 is provided. In a second step 204, carbon nanotubes 106 are grown on the surface of the 2-D fiber cloths 110, oriented approximately perpendicular to the plane of the fiber cloth 110 to form a 3-D fiber preform 302. In a third step 206, the 3-D fiber preforms 302 are infiltrated with the polymer matrix 103 to form the individual lamina 112. In a fourth step 210, the 3-D nanocomposite 100 is formed from the lamina 112 using generally understood laminate assembly techniques, such as, in non-limiting embodiments, hand lay-up or resin transfer molding.

FIGS. 3A-B illustrate one embodiment of the growth of CNTs 106 on the 2-D fiber cloths 110. In one embodiment, the fiber cloth 110 may comprise 2-D plain-weave fiber cloths 110 of SiC, C, and glass. In alternative embodiments, the fiber cloths 110 may comprise satin-weave fiber cloths. In further embodiments, the satin weave fabrics may comprise 5- or 8-harness satin weave fabrics. In additional embodiments, non-SiC fibers having a coating of SiC, such as C and glass-fiber cloths may also be utilized.

The use of 2-D fiber cloths 110 with different weave patterns also allows a measure of control over the degree of the alignment of the CNTs 106 in the 3-D reinforcement 102 and the nanocomposite laminate 100 through-thickness direction. For example, the degree of CNT alignment substantially perpendicular to the 2-D fiber cloth will increase as the weave-harness number increases, as the cloth will have less undulation and more flat areas. Therefore, more CNTs will be substantially aligned perpendicular to the plane of the fiber cloth. Conversely, the degree of CNT alignment substantially perpendicular with respect to the fiber cloth will decrease as the weave-harness number decreases, as the cloth has more undulation and fewer flat areas. Advantageously, as altering the alignment of the through-thickness CNT reinforcement influences the through-thickness properties of the resulting nanocomposites 100, changes in the fiber weave allow the through-thickness properties of the nanocomposites 100 to be adjusted, while keeping the materials and proportion of reinforcing fiber within the nanocomposite 100 approximately constant.

2-D SiC fiber cloths 110 are placed approximately within the middle of a furnace 304, for use as a substrate upon which the nanotubes 106 will grow. In one embodiment, the 2-D SiC fiber cloths 110 have a width of approximately 1 inch, with lengths varying up to approximately eight inches. In one embodiment, the as-received 2-D SiC fiber cloths 110 are fabricated from filaments possessing an average diameter of approximately 16 µm. As illustrated in FIGS. 3A-B, the 2-D SiC fiber cloth 110 can be oriented either vertically (FIG. 3A) or horizontally (FIG. 3B). The vertical orientation allows growth of CNTs 106 on both sides of the 2-D fiber cloth 110, while the horizontal orientation allows growth of CNTs 106 on only one side of the 2-D fiber cloth 110. 2-D SiC fiber cloths 110 with CNTs 106 grown on both sides may be used as 3-D fiber preforms 302 for fabrication of multi-layer 3-D nanocomposites 100, while cloths with CNTs 106 grown on one side may be utilized as 3-D fiber preforms 302 in dual layer 3-D nanocomposites 100.

In a preferred embodiment, nanotubes are grown on the 2-D fiber cloths 110 by chemical vapor deposition (CVD) based on Andrews et al., "Continuous Production of Aligned Carbon Nanotubes: A Step Closer to Commercial Realization," *Chem. Phys. Lett.*, 303, 467-474 (1999), the entirety of which is hereby incorporated by reference. A quartz tube 306 having an inner diameter of approximately two inches is housed in a horizontal furnace 304 for use as a reaction chamber 306. Ferrocene and xylene are utilized as a catalyst precursor and carbon source, respectively, as this combination is known to produce nanotubes which are aligned approximately perpendicular to a substrate surface, such as the 2-D fiber cloth 110. Ferrocene powder is dissolved into the xylene in a ratio of approximately 0.1 mg ferrocene to 10 ml xylene, forming a brown colored precursor solution 310. The furnace 304 is heated and maintained at approximately 800° C. and the ferrocene/xylene precursor solution 310 is injected into the furnace 304 through a syringe pump at a constant speed, approximately 0.1-0.5 ml/min. Argon gas is flowed at approximately 40 s.c.c.m to carry the solution into a steel bottle (not shown) which is pre-heated within the range of about 150 to 200° C., allowing the precursor solution 310 to vaporize before entering the furnace 304 containing the 2-D SiC fiber cloth 110. At approximately 800° C., the precursor solution 310 decomposes into small Fe particles containing dissolved carbon that attach to the surface of the 2-D SiC fiber cloth 110. The nanotubes grow as carbon clusters from the carbon which precipitates out of the Fe particles. In one embodiment, the length of the nanotubes 106 is varied in the range of tens to hundreds of micrometers by adjusting the CVD reaction time, from about 10 minutes to one hour. In one preferred embodiment, nanotubes of about 1 to 500 µm in length more preferably about 60 µm, possessing diameters in the range of about 10 to 100 nm, more preferably about 30-50 nm, are grown after 40 minutes growth, providing sufficient length for mechanical interlocking, as discussed in greater detail below.

In one advantage, the CVD nanotube growth described above allows 3-D fiber preforms 302 having large areas to be easily produced. Furthermore, the size of the 3-D fiber preforms 302 are only limited by the size of the furnace chamber, allowing 3-D fiber preforms 302 of arbitrary size to be produced. For example, in one embodiment, a 3-D fiber preform 302 having dimensions of approximately 13 cm×4 cm are prepared using this method, although preforms 302 of greater or lesser size are also possible.

Figure 4:
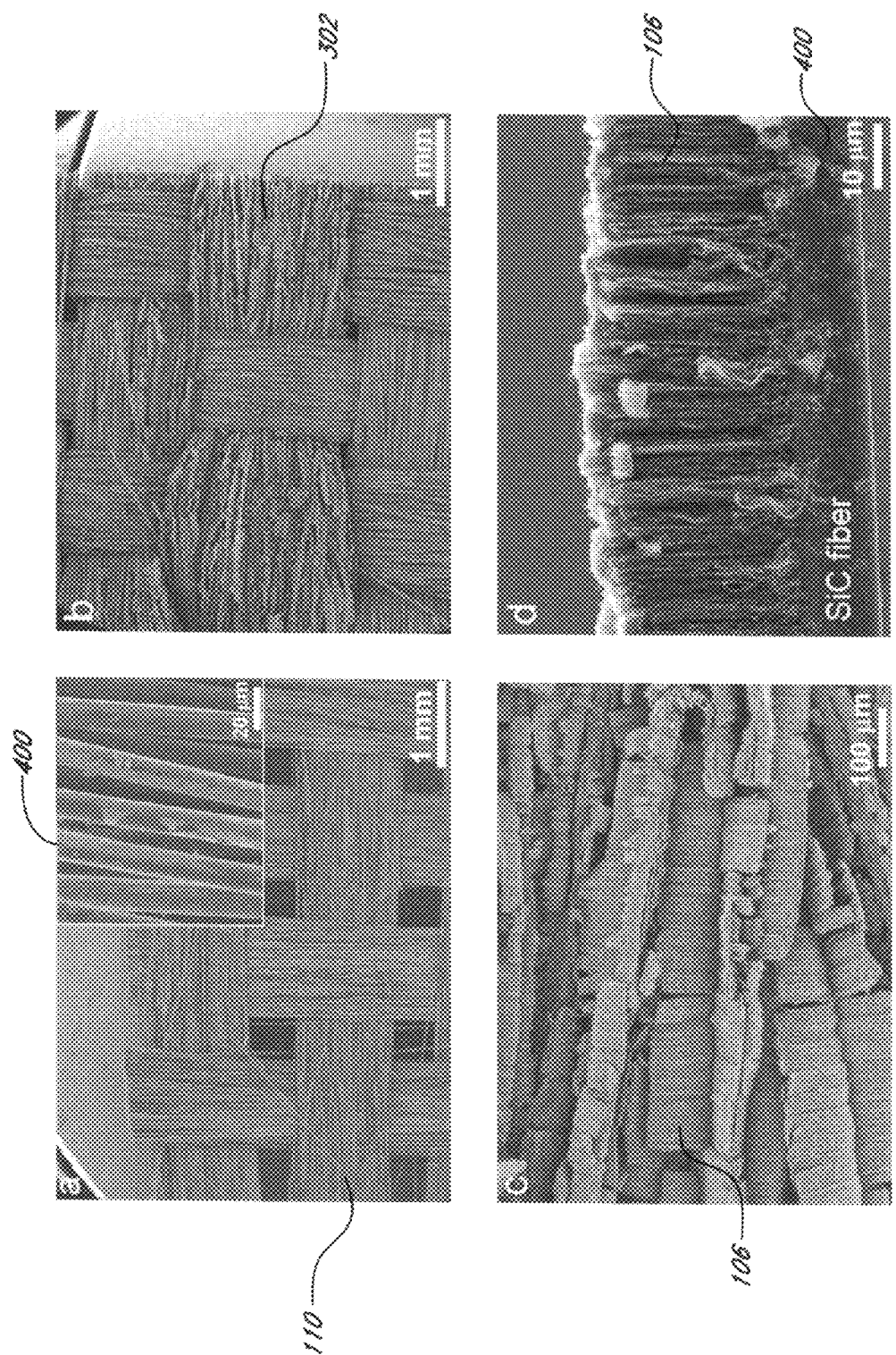
FIGS. 4A-D are scanning electron micrographs of one embodiment of carbon nanotubes grown upon a 2-D woven fiber; (A) Low magnification top down view of received 2-D fiber cloth; (B) Low magnification top down view of 2-D fiber cloth illustrating coverage of the cloth with carbon nanotubes; (C) High magnification view of (B); (D) Through-thickness view of (B), illustrating that the carbon nanotubes are oriented approximately perpendicular to the plane of the fiber cloth.

In a further advantage, the nanotubes grown on the surface of the 2-D SiC fiber cloth 110 are aligned approximately perpendicular to the plane of the 2-D woven fabric 110 and cover the surface of the fiber cloth 110 approximately uniformly. FIGS. 4A-D illustrate top down and cross-sectional micrographs of the 2-D SiC fiber cloth 110 before and after growth of the nanotubes on the surface of the fiber cloth 110. FIG. 4A presents the as-received fiber cloth 110, where the individual filaments 400 are apparent. FIG. 4B illustrates a low magnification, top down view of the 3-D fiber preform 302, in which CNTs 106 are grown on the surface of the 2-D fiber cloth 110. As illustrated in FIG. 4B, the CNTs 106 substantially cover the entire surface of the 2-D fiber cloth after completion of the CVD process, giving the fiber cloth a coarse appearance compared to FIG. 4A. FIG. 4C presents a higher magnification view of FIG. 4B, magnified approximately 10× from FIG. 4B, further illustrating CNTs 106 grown on the surface of the 2-D SiC fiber cloth 110. This view clearly illustrates that the CNTs 106 are grown approximately uniformly on the filaments 400, as all the exposed filaments 400 on the surface of the fiber cloth 110 are covered by CNTs 106. FIG. 4D presents a side view of the CNTs grown on a filament 400 of the 2-D fiber cloth 110, illustrating that the CNTs grown on the 2-D fiber cloth 110 are aligned approximately perpendicular to the plane of the fiber cloth 110 in a linear array.

In one embodiment, the 3D-nanocomposite is fabricated from the 3D-fiber preforms 302 formed as described above with respect to FIG. 2. A plurality of 3-D fiber preforms 302 are stacked, infiltrated with the matrix material or a matrix material precursor, and subsequently cured. In alternative embodiments, the matrix material may be varied, as dictated by the application. In one embodiment, the 3-D fiber preform 302 may be infiltrated with a polymer. In one non-limiting embodiment, the polymer may comprise a high temperature epoxy based on diglycidyl ether of bisphenol A (DGEBPA) and alkylglycidyl ether (AE). In another non-limiting embodiment, the polymer may comprise a pre-ceramic polymer such as KiON CERASET®. Preferably, the viscosity of the matrix designed to be substantially low enough so as to permit substantial wetting of the 3-D fibers preforms 302 with the matrix polymer.

In a preferred embodiment, the 3-D fiber preforms 302 are soaked in a DGEBPA-AE epoxy resin bath for approximately 10 minutes to allow infiltration of the epoxy into the 3-D fiber preform 302. Subsequently, the infiltrated lamina 112 were stacked individually and hand rolled to substantially remove excess resin and achieve compaction as generally understood in the context of conventional wet lay-up and/or prepreg hand lay-up processes. In the next step, stacked laminated structure is subsequently cured in an autoclave at a maximum of 150° C. for one hour to yield the 3-D nanocomposite 100 with the through thickness nanotubes 106 functioning as the core.

In one embodiment, a two layered sandwich composite structure may be formed, where two SiC cloths with CNTs grown on one side reinforce a high temperature epoxy matrix having weight fractions of the matrix, SiC fiber cloth, and CNTs of 35%, 63%, and 2%, respectively.

In further alternative embodiments, nanomaterials may be introduced into the polymer prior to infiltration into the 3-D fiber preform 302 in order to provide dispersion strengthening of the 3-D nanocomposite 100. In one embodiment, the nanomaterials may comprise nanoparticles or CNTs, as disclosed in co-pending patent application entitled, "Polymer Matrix Composites With Nano-Scale Reinforcements", and U.S. Provisional Patent Application Nos. 60/753,006 filed on Dec. 12, 2005, 60/753,155 filed on Dec. 20, 2005, and 60/753,496 filed on Dec. 22, 2005 entitled SUPER PERFORMING CNT/EPOXY RESIN, the entirety of each of which is hereby incorporated by reference. In one embodiment, low weight fractions of nanoparticles, such as $TiO_2$, SiC, $Y_2O_3$, ZnO, and C, or carbon nanotubes comprising SWNTs, are substantially uniformly distributed within the matrix polymer using a magnetic stirring technique. Preferably, these nanomaterials are dispersed within the matrix such that they are substantially disconnected from the woven fiber cloth.

In additional alternative embodiments, the degree of dispersion and efficacy of the nanomaterial reinforcement may be adjusted. Adjustments may comprise, but are not limited to, variation of the nanotube diameter/length, nanoparticle size, and the weight percentage of either nanotubes or nanoparticles. Advantageously, the addition of the discrete nanotube or nanoparticle reinforcements within the matrix allows further adjustment of the properties of the 3-D nanocomposites so as to tailor the nanocomposite 100 as necessary to meet the demands of particular applications.

In further embodiments, the adhesion properties of the CNTs to the 2-D fiber cloth may be also varied using an annealing technique in order to vary the properties of the resultant 3-D nanocomposite 100. In one embodiment, the adhesion strength of the CNT-fiber interface may be strengthened by subjecting the 3-D fiber preform 302 to a heat treatment of approximately 950° C. for approximately 1-6 hours in an argon atmosphere. In a non-limiting example, a heat treatment of 950° C. for approximately six hours has been observed to provide a nearly two-fold increase in adhesion strength of CNT nanobrushes on SiC fiber, from about 0.1 to 0.3 MPa to approximately 0.5 MPa. Therefore high-temperature annealing is an additional processing step which may optionally be used to enhance the adhesion strength between nanotubes and SiC fibers and thus in turn, influence the nanocomposite 100 properties.

EXAMPLES

In the following examples, testing is performed on 3-D nanocomposites and their 2-D counterparts to illustrate the property improvements which may be achieved through embodiments of the 3-D nanocomposite 100. In particular, in-plane and interlaminar mechanical properties, mechanical damping, thermoelastic response, and thermal and electrical conductivities are examined. The 3-D nanocomposites 100 tested are laminates formed as described above, using a 3-D fiber preform 302 of SiC plain-weave fiber cloths having CVD-grown MWCNTs extending approximately perpendicular to the plane of the SiC fiber cloth and a matrix of DGEBPA-AE. The nanocomposites further possess weight fractions of the matrix, SiC fiber cloth, and CNTs of approximately 35%, 63%, and 2%, respectively. To assess the influence of the through-thickness CNTs on performance of the 3-D nanocomposites 100, 2-D baseline composites were similarly formed without the MWCNT reinforcement.

Studies are also presented which investigate the growth of carbon nanotubes on substrates comprising non-SiC fibers, such as carbon and glass-fiber cloths coated with a layer of SiC. The coating is provided on the surface of carbon fibers in order to allow these fibers to function as suitable substrates for the growth of CNTs using the CVD deposition techniques discussed above. To assess the influence of the SiC coating on the CVD growth of CNTs on carbon cloths, uncoated and coated carbon fibers are examined.

Examples 1-4

Interlaminar Fracture

Examples 1-4 illustrate the advantages of using of 3-D nanocomposites over their 2-D counterparts to increase the delamination resistance of the composite. One of the most commonly observed damage modes in laminated composites is the separation of adjacent plies, or delamination. Delamination in laminated composites may arise from one of the many events, including low velocity impacts, fatigue loadings, eccentricities in the load path, or by geometric and structural discontinuities, such as holes, edges, or ply drops, that act as stress raisers within the area adjacent to the discontinuity. With the increased use of laminated fiber reinforced composite materials in primary aircraft and marine structural components, delamination failure is a significant concern. Therefore, interlaminar fracture toughness testing is performed to determine interlaminar fracture toughness for two different modes of loading, Mode I, an opening mode, and Mode II, a sliding mode.

Figures 5, 5C, 5D:
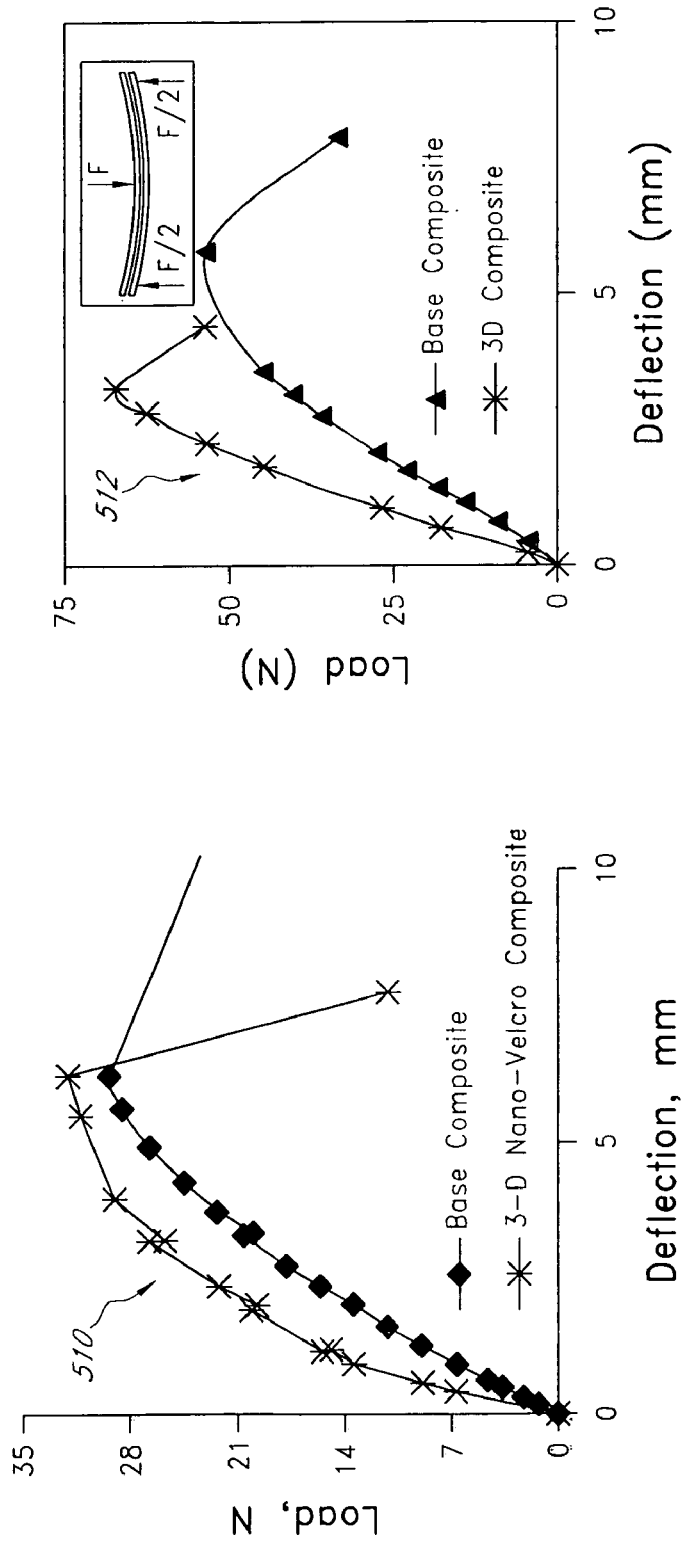

Mode I fracture toughness testing is performed according to ASTM standard D 5528-94a, "Test Method for Mode I Interlaminar Fracture Toughness of Unidirectional Fiber-Reinforced Polymer Matrix Composites." The specimen geometry for this testing, a double cantilever beam 500 (DCB), is illustrated in FIG. 5A. The DCB specimen 500 is a rectangular beam having length, L, of approximately 120 mm and a width, W, of approximately 20 mm. An initial crack 502 of length $a_o$ is introduced between the lamina 112 by insertion of a Teflon™ film approximately 12.5 μm thick. The lamina 112 are pulled apart with an applied force, F, using an Instron 4206 testing machine and the load and displacements are recorded. To avoid bending failure at the root of arms of the specimen, sheet metal tabs (not shown) are adhesively bonded to each side of the specimen. The crack 502 is monitored to determine a critical force, $F_c$, and displacement, δc, at which the crack 502 starts to propagate along the length, L, of the DCB specimen 500. The Mode I fracture toughness, $G_{IC}$, is calculated using Equation (1)

$$G_{IC} = \frac{nP_c\delta_c}{2wa_o} \quad (1)$$

where n is the slope of a plot of log ($\delta_C/P_C$) versus log $a_o$.

Mode II interlaminar fracture toughness testing is performed according to the method of Adams, et al. in "Experimental Characterization of Advanced composite Materials," $3^{rd}$ Ed. The test is conducted using an end notched flexure (ENF) specimen 506, as illustrated in FIG. 5B. The ENF specimens 506 possess the same dimensions and crack length as the DCB specimens 500 discussed above. The lamina 112 are slid past one another by loading the ENF specimen in flexure, compressively loading of the ENF specimen 506 at approximately the center of the length with a force F while supporting the specimen 506 ends. Testing is conducted using an Instron 4206 testing machine and the load and displacements are recorded. The crack 502 is monitored to determine the critical compressive force, $F_c$, and displacement, δc, at which the crack 502 starts to propagate along the length, L, of the DCB specimen 506. The fracture toughness, $G_{IIC}$, is calculated using Equation (2) (Adams et al., 2003):

$$G_{IC} = \frac{9a^2 F_c C}{2WL^3[1 + 1.5(2a/L)^3]} \quad (2)$$

where Fc is the load at the onset of non-linearity in the load-displacement response, and C is the compliance of the linear portion of the load-displacement response. Using Equation 2, the $G_{IIC}$ is calculated for both the 3-D nanocomposites and comparable 2-D composites and the results are presented in Table 1 below. It should be noted that Equation 2 is not compliance corrected, as it is used for comparison purposes between the 2-D baseline composite and 3-D nanocomposite.

Using Equations 1 and 2, the $G_{IC}$ and $G_{IIC}$ are calculated for both the 3-D nanocomposites and comparable 2-D composites. Average values for three test specimens are presented in Table 1 below.

TABLE 1

$G_{IC}$ of 2-D baseline composites and 3-D nanocomposites.

| Example | Materials | Mode | $G_{IC}$ (kJ/m²) | % Change From Baseline |
|---|---|---|---|---|
| 1C | 2-D Baseline composite | I | 0.95 | N/A |
| 2 | 3-D Nanocomposite | I | 4.26 | 450 |
| 3C | 2-D Baseline composite | II | 91e-3 | N/A |
| 4 | 3-D Nanocomposite | II | 140e-3 | 54 |

As shown in Table 1, the addition of through-thickness CNTs significantly improves the Mode I and Mode II interlaminar fracture toughness of the 3-D nanocomposite over the 2-D baseline composite. Qualitatively examining the load-deflection response 510 and 512 of the Mode I and Mode II tests, respectively, for each material, FIGS. 5C-D, it is observed that for the same applied load, the deflection of the 3-D nanocomposite is less than the 2-D baseline composite, indicating that the interlaminar fracture toughness of the 3D nanocomposite greater than the 2-D baseline composite. This conclusion is quantitatively supported by the $G_{IC}$ and $G_{IIC}$ measurements. In Mode I, the 3-D nanocomposite demonstrates a $G_{IC}$ of approximately 4.26 kJ/m², compared to that measured for the 2-D baseline composites, approximately 0.95 kJ/m². These results represent an over four-fold improvement in the Mode I fracture toughness of the 3-D nanocomposite over the 2-D baseline composite. In Mode II, the 3-D nanocomposite demonstrates a $G_{IIC}$ of approximately 140 J/m², compared to the 2-D baseline composite value of approximately 91 J/m². These results represent an improvement of over fifty percent in the Mode II fracture toughness of the 3-D nanocomposite over the 2-D baseline composite.

That the improved toughness of the 3-D nanocomposite is provided by the through-thickness nanotubes 106 can also be seen in SEM micrographs of the fracture surfaces of the two composites between adjacent lamina of the 2-D baseline composite (FIG. 6A) and the 3-D nanocomposite (FIG. 6B). The 2-D baseline composite exhibits a relatively smooth fracture surface 600 within the matrix 103. In contrast, as illustrated in FIG. 6B and inset, the 3-D nanocomposite 100 exhibits a plurality of nanotubes 106 which extend outward from the fracture surface 602 which are embedded within the matrix 103. As a result, nanotubes 106 from adjacent lamina interlock during fabrication of the nanocomposite, providing a mechanical interconnection between the 3-D fiber preform of the adjacent lamina. This interlocking increases the resistance to lamina separation, and raises the interlaminar toughness in both Mode I and Mode II loadings.

Examples 5-6

In-Plane Mechanical Characterization

Examples 5-6 illustrate the effect of CNTs on the in-plane mechanical properties of 2-D baseline composites and 3-D nanocomposites. The in-plane tensile strength, elastic modulus, and flexural toughness of the two composite systems are measured by 3-point, in-plane flexure loading based upon ASTM Standard D790-00, titled, "Standard Test Methods for Flexural Properties of Unreinforced and Reinforced Plastics and Electrical Insulating Materials." Average values for three test specimens are reported in Table 2 below, with the percent change in the 3-D nanocomposite property values over the 2-D baseline composite in parentheses.

TABLE 2

$G_{IC}$ of 2-D baseline composites and 3-D nanocomposites.

| Example | Materials | Flexural Strength (MPa) | Flexural Modulus (GPa) | Flexural Toughness (N mm) |
|---|---|---|---|---|
| 5C | 2-D Baseline Composites | 62.1 ± 2.1 | 23.1 ± 0.3 | 5.8 |
| 6 | 3-D Nanocomposites | 150.1 ± 1.4 (240%) | 24.3 ± 0.2 (105%) | 30.4 (524%) |

Examples 5-6 demonstrate that the through-thickness CNTs may provide significantly improved in-plane mechanical properties over their 2-D counterparts, rather than the diminishment of the mechanical properties, as observed when adding through-thickness reinforcements to other composite systems. Flexural strength increases over two-fold, from about 62.1 MPa to approximately 150.1 MPa. Similarly, flexural toughness increases over five-fold, from approximately 5.8 N mm to approximately 30.4 N mm. Flexural modulus is found to remain approximately unchanged, increasing approximately five percent from 23.1 GPa to 24.3 GPa.

Example 7-8

Indentation Hardness and Modulus

Example 7-8 illustrates the spatial homogeneity of the properties of 3-D nanocomposites. A concern with the introduction of the through-thickness reinforcement is the uniformity of properties arising from the reinforcement. That is to say, the reinforcement may cause spatial variation in local mechanical properties. These variations are not apparent in macro-scale testing, in which relatively large volumes of the composite are sampled, providing an average property value. Thus, nanoindentation is performed in order to measure hardness and modulus through the thickness of the composite.

Nanoindentation of the 2-D baseline composite and the 3-D nanocomposite is performed using the MTS NanoIndenter™ XP (MTS Nano Instruments, Oak Ridge, Tenn.). The nanoindentation is conducted according to procedure outlined in the Product Data Sheet for the NanoIndenter™. Samples are cut and polished flat using an approximately 0.5 µm grit. Samples are mounted for stability to an aluminum stub using epoxy. In the indentation test, an area of the nanocomposite is selected, a hard tip is pressed into the sample at a known load for a predetermined time, and the residual area of the indent is determined. Load and displacement are continuously recorded during testing. The hardness is proportional to the applied load divided by the area of the indent. The loading increment is maintained at approximately 5% of the present load per second. The maximum indentation load was varied over the range of approximately 0.115-2.5 µN to provide measurements at through-thickness depths up to approximately 1 µm. Ten indentations were carried out at each depth and the average result is reported. The results of these tests are illustrated in FIGS. 7A-B, with error bars representing one standard deviation of the mean.

Examples 7-8 demonstrate that the spatial variation in the hardness and modulus of the 3-D nanocomposite is comparable to the 2-D baseline composite. As illustrated in FIGS. 7A-B, the elastic modulus and hardness of the 3-D nanocomposite follow approximately the same trend as the 2-D baseline composites, indicating that the spatial variation of through-thickness properties in the nanocomposite is comparable to the baseline. Moreover, over the range of depths examined, the modulus is of the 3D nanocomposite is slightly elevated over that of the 2-D baseline composite, approximately 12-30%. This result further reinforces the results of in-plane testing demonstrating that the elastic modulus of the 3-D nanocomposite is modestly greater than the elastic modulus of the 2-D baseline composite.

Examples 9-10

Mechanical Damping

Examples 9-10 illustrate the effect of through-thickness CNTs on the mechanical damping properties of 2-D baseline composites and 3-D nanocomposites. Mechanical damping is the dissipation of vibrational energy under cyclic loading. Greater damping in a structure can therefore reduce the amplitude of vibrations imposed by an applied load, improving the fatigue life of a system. The fact that CNTs undergo high frequency deformations qualifies them as a strong candidate for structural damping applications.

The natural frequencies and damping of the 3-D nanocomposite 100 are measured and compared to those of their 2-D composite counterparts. The damping test specimens 800 are generally rectangular beams which are fixed in place at one end, as shown in FIG. 8A. The damping specimens 800 possess length, L, width W, and thickness, T, of approximately 21.65 mm×1.25 mm×25.4 mm, respectively. The free end of the damping specimen 800 is initially moved to a predetermined distance and then released, causing free vibration of the damping specimen 800. The displacement at the free end of the damping specimen 800 is monitored by a laser displacement sensor 802, recorded by a laser displacement controller 804, and transformed into frequency domain with a dynamic signal analyzer 806.

An exemplifying vibrational amplitude-frequency curve is illustrated in FIG. 7B. From this curve, a natural vibration frequency, $f_n$, and damping ratio, $\zeta$, are calculated using Equations 3 and 4:

$$\zeta = \frac{f_2 - f_1}{2 f_m} \quad (3)$$
$$= \frac{\Delta f}{2 f_m}$$

$$f_n = \frac{1}{\sqrt{1 - 2\zeta^2}} f_m \quad (4)$$

where $f_m$ is the frequency at which the measured vibrational amplitude (A) is maximum, $f_1$ and $f_2$ are the two frequencies at which the amplitude is 0.707 times of its maximum, and $\Delta f$ is the difference between $f_2$ and $f_1$, also called half-power bandwidth. If $\zeta \ll 1$, then $f_n \approx f_m$. The damping factor, C, may be calculated using Equation (5)

$$C = (4\pi M)(f_n \zeta) \tag{5}$$

The damping ratio represents the ratio of actual damping, C, to a critical damping, $C_c$, that can prevent vibration, even at resonant frequency. Therefore, the closer the damping factor is to 1, the higher the degree of damping possessed by a structure. The average results of three tests are reported below in Table 3.

TABLE 3

Mechanical damping properties of 2-D baseline composites and 3-D nanocomposites.

| Example | Materials | $f_m$ (Hz) | $\zeta$ (× 10$^{-3}$) | $f_n$ (Hz) | Normalized damping $\dfrac{C}{(4\pi M)} = \zeta f_n$ |
|---|---|---|---|---|---|
| 3C | 2-D Baseline Composite | 753.8 | 9.5 | 753.9 | 7.162 |
| 4 | 3-D Nanocomposite | 598.2 | 73.1 (770%) | 601.4 | 43.963 (613%) |

As illustrated in Table 3, addition of the through-thickness nanotubes to the 3-D nanocomposite provides significantly increased mechanical damping over the 2-D baseline composite. In particular, the 3-D nanocomposite provides an over seven fold increase in the damping ratio, from 0.0095 to 0.0731, and over a six-fold increase in the normalized damping factor. These results illustrate the benefits of using the 3-D nanocomposite in applications where structural damping is desired.

Examples 11-12

Thermal Conductivity

Examples 11-12 illustrate the effect of CNTs on the through-thickness thermal conductivity of 2-D baseline composites and 3-D nanocomposites. Thermal conductivity, K, is a material property which provides a measure of the rate at which heat is transferred through the material by conduction. For one-dimensional, steady-state conduction in a thermal conductivity test sample 900 with an approximately constant cross-sectional area, FIG. 9A, thermal conductivity, can be determined from Equation 6:

$$K = \left(\frac{Q}{A}\right)\left(\frac{\Delta T}{\Delta L}\right) \tag{6}$$

where Q is the amount of heat passing through a cross section, A, of the test sample 900, giving rise to a temperature difference, $\Delta T = T_1 - T_2$, over a distance $\Delta L$.

The tests are conducted using Anter Corporation's Unitherm™ Model 2022 Thermal Conductivity Measuring System in accordance with ASTM Standard E1530, "Guarded Heat Flow Meter Test Method". During the test, the sample is held under a uniform compressive load between two polished surfaces (not shown), each at a different temperature, where the lower surface is part of a calibrated heat flow transducer. Heat, Q, flows from the upper surface, through the sample 900, to the lower surface, establishing an axial temperature gradient in the sample. After reaching thermal equilibrium, $\Delta T$ across the sample 900 is measured with temperature sensors in the highly conductive metal surface layers on either side of the sample 900 and the heat flow is measured with the heat flow transducer. The temperature gradient, $\Delta T$, the sample thickness, $\Delta L$, and the sample cross-sectional area, A, are then used to calculate the thermal conductivity from Equation 6.

FIG. 9B illustrates the thermal conductivity of the 2-D baseline composite and 3-D nanocomposite at temperatures of approximately 8, 75, and 125° C. The data demonstrate consistent improvements in the thermal conductivity of the 3-D nanocomposite compared to the 2-D baseline composite over the complete range of temperatures probed, from approximately 30% or more at temperatures of around 10° C. to approximately 50% or more at temperatures of approximately 125° C.

Examples 13-14

Thermal Expansion

Examples 13-14 illustrate the effect of CNTs on the through-thickness thermal expansion of 2-D baseline composites and 3-D nanocomposites. The thermoelastic behavior of composites plays a major role in their dimensional stability and tolerances, particularly under severe temperature changes. In particular, when the composite is dimensionally constrained, large dimensional changes can give rise to large thermal stresses, which in turn can lead to cracking and premature failure of the composite. For example, low thermal expansion is particularly important for structures that are sensitive to shape changes and operate under tight tolerances, such as those used in space optics, e.g., space telescopes and satellite dishes.

To characterize the through-the-thickness thermoelastic dimensional stability of the composite specimens, the Coefficient of Thermal Expansion (CTE) of the 2-D baseline composites and 3-D nanocomposites are measured and compared. The through-the-thickness measurements are made with a Michelson laser interferometer measurement system based on ASTM Standard E289-04, "Standard Test Method for Linear thermal Expansion of Rigid Solids with Interferometry" and performed under vacuum. Test specimens are heated to approximately 150° C. and held at temperature until their dimensions stabilize. Measurements of the specimen dimensions are taken as the specimen temperature is cycled between the temperatures of approximately 150° C. to 0° C. for at least 1 full temperature cycle. Further, the specimen thickness change and temperature are continuously recorded during the tests. The average of three CTE measurements in each composite material is presented in Table 4 below.

TABLE 4

Thermal Expansion Coefficient of 2-D baseline composites and 3-D nanocomposites.

| Example | Material Type | Average CTE over 0° to 150° C. (p.p.m/° C.) | % Change From Baseline |
|---------|---------------|---------------------------------------------|------------------------|
| 7C | 2-D Baseline composite | 123.9 ± 0.4 | N/A |
| 8 | 3-D Nanocomposite | 47.3 ± 0.3 | −62% |

Examples 13-14 illustrate the improved dimensional stability provided to the composite by the through-thickness nanotube reinforcement. The average CTE is reduced by approximately 62%, from about 123.9 p.p.m/° C. in the 2-D baseline composite, to about 47.3 p.p.m/° C. in the 3-D nanocomposite. These results indicate that having nanotubes in the through-the-thickness direction significantly reduces the degree to which the 3-D composite dimensions change with variations in temperature over the 2-D baseline composite.

Examples 15-16

Electrical Conductivity

Examples 15-16 illustrate the effect of CNTs on the through-thickness electrical conductivity of 2-D baseline composites and 3-D nanocomposites. Electrical conductivity, σ, is a measure of a material's ability to conduct electrical current. For a body of length L, cross-sectional area A, and resistance R, the electrical conductivity is calculated from Equation 7:

$$\sigma = \frac{L}{RA} \quad (7)$$

Figure 10:
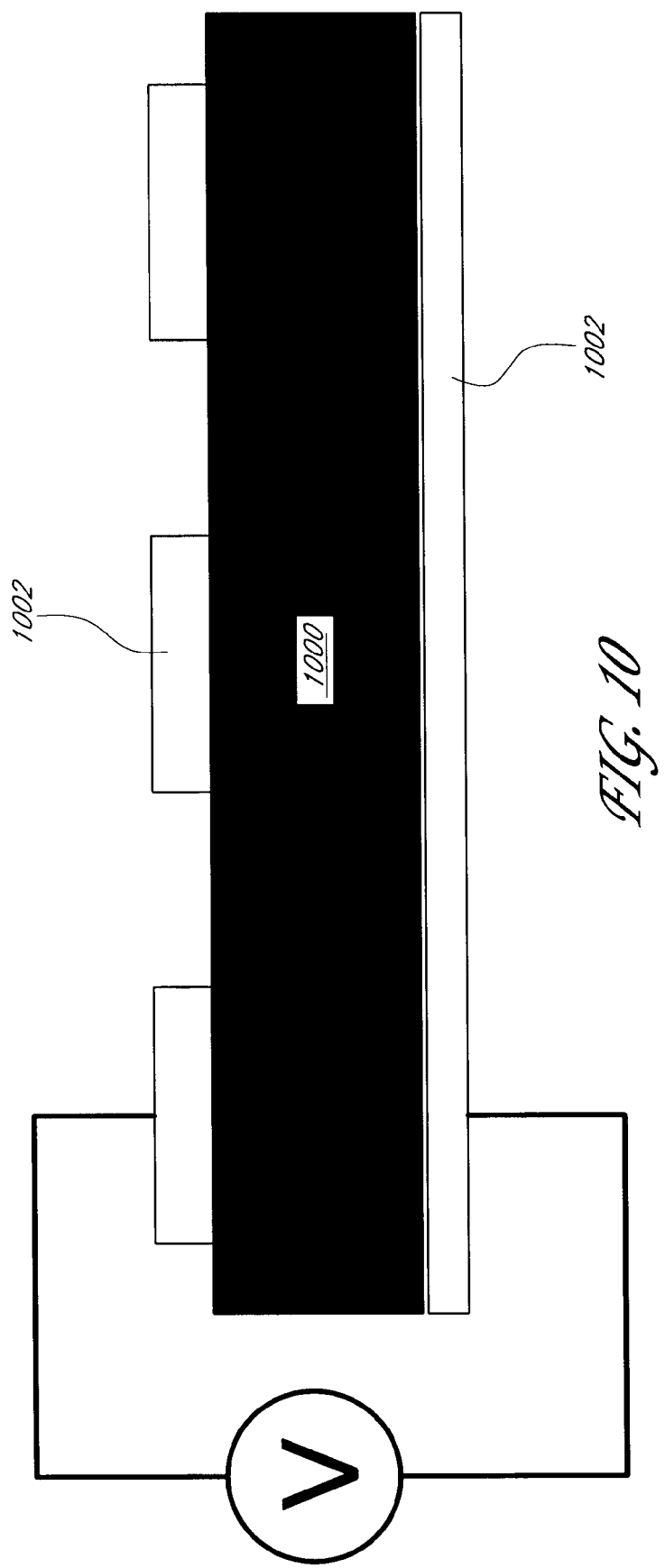
FIG. 10 is one embodiment of a test sample for measurement of through-thickness electrical conductivity.

A two probe measuring method, where the resistance of an electrical conductivity test specimen 1000 is measured at a number of predetermined locations of the specimen, FIG. 10, to determine its electrical conductivity. Tests are performed by polishing the upper and lower surfaces of the test specimen 1000 and depositing gold layers 1002 on the predetermined locations to form an electrical contact, as illustrated in FIG. 10. The average of three tests for each composite are reported in Table 5 below.

TABLE 5

Through-thickness electrical conductivity of 2-D baseline composite and the 3-D nanocomposite.

| Example | Material Type | Conductivity (S/cm) |
|---------|---------------|---------------------|
| 7C | 2-D Baseline composite | 0.075E-6 |
| 8 | 3-D Nanocomposite | 0.408 |

As shown in Table 5, the average electrical conductivity of the 3-D nanocomposites is significantly higher than that of the 2-D composite. In particular, the electrical conductivity of the 3-D nanocomposite was approximately 0.408 S/cm, while that of the 2-D baseline composite was approximately 0.075 e-6 S/cm, an increase of over million-fold. In other words, the 2-D baseline composite is substantially non-conducting through the thickness but the 3-D nanocomposite is substantially conducting. These results demonstrate the significant, beneficial influence that the CNTs may exert on the through-thickness conductivity in the 3-D nanocomposites.

The relatively high electrical conductivity of the 3-D nanocomposite in the through-thickness direction further expands the capability of the nanocomposite. In one embodiment, the 3-D nanocomposite may be configured to act as a sensor which monitors the development of cracks and crack growth in the 3-D nanocomposites, providing a relative measure of the "health" of the nanocomposite. In embodiments of 3-D nanocomposites with health monitoring capability, electrical connections are attached along a notched composite, such as the DCB and ENF specimens described above with respect to FIG. 5. Specimens are loaded and the resulting crack growth measured using any combination of optical, mechanical, and crack gauge techniques as generally understood in the art for the DCB and ENF loadings. Concurrent, continuous measurement of the electrical conductivity thus provides electrical conductivity as a function of crack growth and delamination. With this calibration, the electrical conductivity of 3-D nanocomposites deployed in the field may be measured to determine the extent of any cracking within the composite.

Advantageously, this health monitoring capability significantly improves the safety of using the 3-D nanocomposites. Monitoring the extent of cracking by electrical conductivity is non-destructive, allowing technicians to establish the extent of cracking without damaging or destroying the composite. Further, monitoring cracks in this manner is superior to optical observations, as it may detect sub-surface cracking as well as fine cracks which are not apparent through the naked eye or light microscopy. Furthermore, 3-D nanocomposite materials may be deployed in-service with the health monitoring configured to provide real-time measurements of the extent of cracking, allowing technicians to replace damaged 3-D nanocomposites while within safety tolerances.

Example 17

Modeling

Example 17 illustrates analytical and finite element modeling of the thermomechanical behavior of individual CNTs. The analytical and computational methods discussed in detail below may substantiate the results from the experiments of the nanocomposite specimens discussed in the examples above.

Figures 11A, 11B:
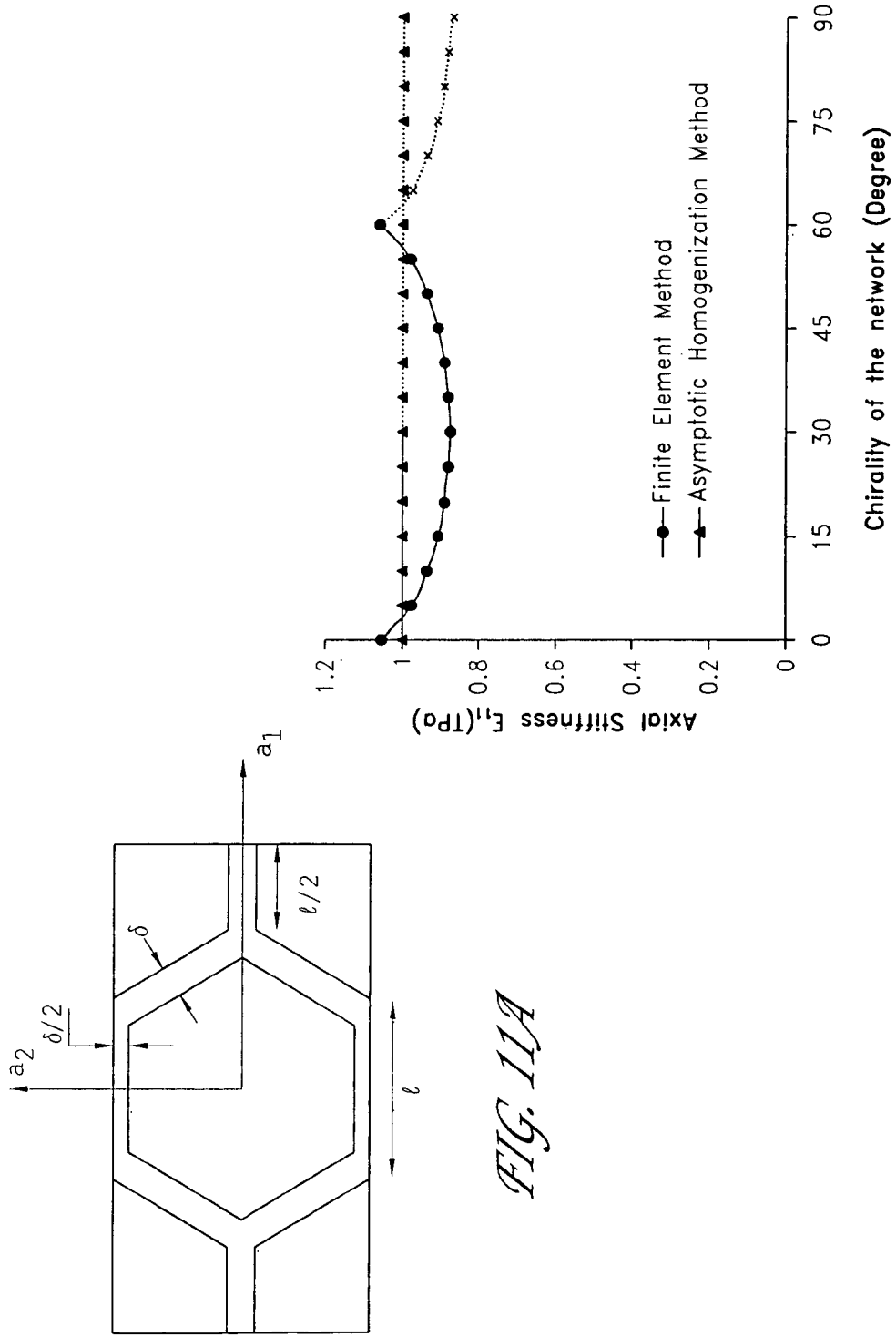
FIGS. 11A-B illustrate certain embodiments of analytical and finite element modeling of the mechanical and thermoelastic behavior of carbon nanotubes a function of chirality angles; (A) Periodicity cell utilized in an Asymptotic Harmonization Method (AHM); (B) Comparison of SWNTs as a function of chirality angle using AHM and finite element modeling.

The mechanical and thermoelastic behavior of carbon nanotubes are examined as a function of chirality angles, as illustrated in FIGS. 11A-B. Asymptotic Homogenization Method (AHM) is utilized for analytical study and finite element analysis (FEA) is utilized as a numerical approach. The thermomechanical behavior of individual CNTs are examined. A periodicity cell of the graphene sheet forming SWNT is considered, as illustrated in FIG. 11A.

Using AHM, a simple working formulae for substantially the entire elastic and thermoelastic effective properties of a single-walled nanotube is derived (Kalamkarov, "Mechanical Properties Modeling of Carbon Single-Walled Nanotubes Filled with Matrix," *J. of Comp. Mater*, accepted for publication, (2005, in press). Based on these results, it is inferred that the Young's modulus of a single-walled nanotube substantially increases with decreasing tube radius and increasing effective wall thickness of the tube, as illustrated in Equation 8 below:

$$E_{SWNT} = \frac{\pi}{6\sqrt{3}}\left(\frac{\delta E}{l}\right) \quad (8)$$

where δ, l, and E represent the diameter, length, and Young's modulus of C-C links, respectively, forming the periodicity cell (FIG. 11A). The results of these analytical modeling are compared with those obtained from finite element modeling and excellent agreement is achieved (Ghasemi-Nejhad and Askari, "Mechanical Properties Modeling of Carbon Single-Walled Nanotubes: A Finite Element Method", *J. Comput. and Theor. Nanosci.* 2, 298-318 (2005).

The chirality dependence of the thermomechanical performance of CNTs using both AHM and FEA has also been examined, as discussed in Veedu et al., "Chirality Dependence of Carbon Single-Walled Nanotube Material properties: Axial Young's Modulus," *J. Nanosci. & Nanotech.* (accepted for publication, 2005) and Askari et al, "Chirality Dependence of Carbon Single-Walled Nanotube Material properties: Axial Coefficient of Thermal Expansion," *J. Nanosci. & Nanotech.* (accepted for publication, 2005). The results of this investigation are illustrated in FIG. 11B. Based on these results, it is determined that AHM predicts substantially no chirality dependence in the axial Young's modulus of a carbon SWNT. This result which may be attributed to the volume averaging and homogenization technique that has been performed in this method, however, the model very well succeeds in developing the structural parameters dependencies of the modulus. Finite element analyses of the carbon networks with different structures, such as zigzag, armchair, and chiral structures, predict a slight dependency of the axial Young's modulus of SWNT on its chirality angle (FIG. 11B). The finite element analysis further predicts that the zigzag SWNT has the highest axial modulus and the armchair nanotube has the lowest modulus. The chiral SWNTs lie in between these two limits, with a trend of decrease in modulus with increasing chirality from zigzag to armchair configurations.

Advantageously, these results allow prediction of the effective properties of 3-D nanocomposites. Furthermore, the effects of adhesion strength of the CNT-fiber interface on the properties of the 3-D nanocomposites may be predicted.

Examples 18-19

SiC Coated Fiber Cloths

Examples 18 and 19 investigate the effects of SiC coatings on non-SiC fiber cloths used as substrates for CVD CNT growth. Growth of CNTs on both uncoated glass fiber cloths and coated carbon fiber cloths are performed and examined to assess the influence of the SiC coating on the growth.

The SiC coatings are provided through use of a pre-ceramic polymer. Pre-ceramic polymers can be comprised of an organo-metallic polymer which, after a pyrolysis step, is transformed into ceramic materials. For example, the KiON CERASET® family of pre-ceramic polymers are liquid compositions which may provide SiC, SiN, and silicon carboxide, depending on gas environment and the parameters employed during pyrolysis. In the following examples, carbon fiber cloths are coated with a layer of KiON CERASET® and pyrolyzed in an inert nitrogen environment to provide a coating of SiC over approximately the surface of the carbon fiber cloths. In one embodiment, the diameter of the filaments within the fiber cloth is approximately 16 microns, and the thickness of the SiC coating is on the order of the fiber diameter, within the range of approximately 10 to 20 microns.

The SiC coating is provided on carbon fiber cloths in the following manner. In a first step, the polymer composition is applied to the fiber cloths. A pre-ceramic polymer composition is prepared by mixing KiON CERASET® with approximately 2 wt % dicumyl peroxide, a free radical initiator, on the basis of the total weight of the composition. The carbon fiber cloths, meanwhile, are laid upon a tooling surface, such as an aluminum plate. Following preparation of the composition, the composition is applied to the fiber cloths by brushing, which provides control over the uniformity, wetting, and thickness of the coating on the woven fiber cloths. However, it may be understood that alternative coating methods known in the art, including but not limited to spraying and dipping, may also utilized to coat the fiber cloths with the pre-ceramic composition in alternative embodiments.

In a second step, the pre-ceramic polymer is converted to a ceramic through curing and pyrolysis operations. As described below, the ceramic formed comprises SiC, although it may be understood that the pre-ceramic polymer may be pyrolyzed to yield other ceramics by modifying the procedure discussed below as understood by those of skill in the art. The tooling surface containing the treated carbon fiber cloths is placed within a mechanical convection oven and subjected to a curing operation according to the manufacturer's cure cycle. One embodiment of such a curing operation is illustrated in FIG. 12A, which is performed under approximately atmospheric pressure. In a first stage of the cure, the treated cloths are heated from approximately room temperature (22° C.) to a target temperature of approximately 200° C. Heating is performed over the period of about one hour at a constant heating rate of approximately 2.9° C./min at approximately atmospheric pressure. Upon reaching the approximately 200° C. target temperature, this temperature is maintained for approximately one hour. Following the heat treatment at the target temperature, the fiber cloths are cooled from approximately 200° C. to approximately 75° C. at a rate of about 2.1° C. for approximately one hour. Subsequently, the oven is turned off to allow the fiber cloth to cool down to approximately room temperature by natural convection. This cure substantially converts the pre-ceramic polymer composition to a solid, cross-linked polymer through a vinyl cross-linking mechanism.

Following the curing process, the carbon fiber cloths are pyrolyzed to convert the cross-linked polymer into SiC. The carbon fiber cloths are removed from the convection oven and placed within a tube furnace containing a nitrogen environment in which the nitrogen flows at a rate of approximately 150 CC/min. The pyrolysis heat treatment is illustrated in FIG. 12B. The fiber cloth samples are heated from approximately room temperature to about 100° C. at a heating rate of approximately 2° C./min, maintained at about 100° C. for approximately 2 hours, heated from about 100° C. to about 700° C. at a rate of approximately 10° C./min, maintained at about 700° C. for approximately one hour, heated from approximately 700° C. to approximately 1000° C. at a rate of about 5° C./min, maintained at about 1000° C. for approximately one hour. The furnace is then allowed to cool down from about 1000° C. to approximately 250° C. at a rate of approximately 3° C./min under the nitrogen gas flow. The fiber cloths are then cooled down to room temperature by natural convection and removed from the tube furnace. Following this procedure, the carbon fiber cloths possess a layer of SiC on their surface having a thickness in the range of approximately 10-20 um.

Growth of CNTs by the CVD methods discussed above is performed on both uncoated glass-fiber and carbon fiber cloths as well as coated carbon fiber cloths to evaluate the influence of the SiC coating (FIGS. 13A-D and FIGS. 14A-B). The fiber cloths are placed in a two-stage tubular quartz reactor having an inner diameter of approximately 50 mm. A precursor solution comprising approximately 1 gram of Ferrocene (98%, Sigma Aldrich) dissolved in approximately 100 ml of Xylene (Fisher Scientific) is fed continuously into the two-stage tubular quartz reactor using a syringe pump. The liquid feed is passed through a capillary tube and preheated to approximately 180° C. prior to its entry into the quartz furnace. At this temperature, the precursor solution exiting the capillary is immediately vaporized and swept into the reaction zone of the furnace by a flow of argon gas mixed with approximately 10% hydrogen. The furnace temperature, ferrocene-xylene feed rate, total reaction time, and argon sweep gas flow rate were adjusted to about 770° C., about 0.125 CC/min, approximately 1 hour, and approximately 60 CC/min, respectively, for growing the aligned MWCNTs on the fibers and their cloth. After the approximately 1 hour reaction time, the pre-heater and the furnace are allowed to cool to room temperature in flowing argon gas environment.

Figure 13B:
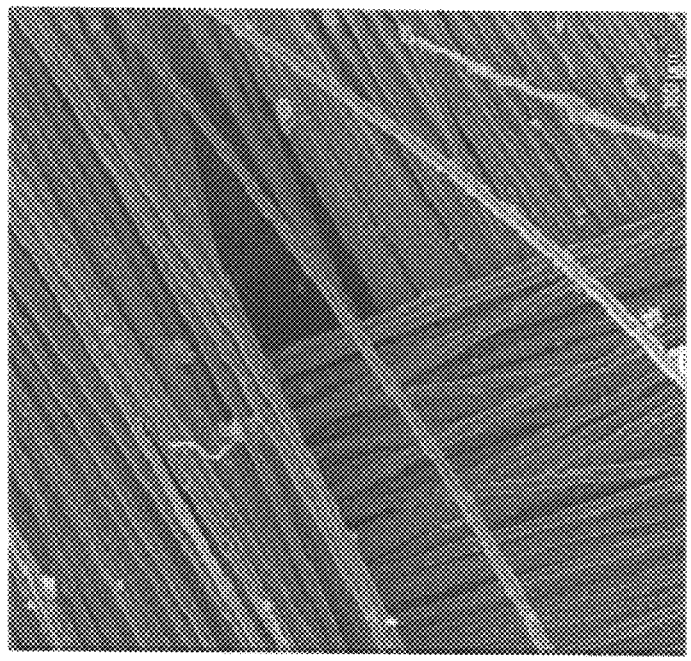
FIGS. 13A-D are scanning electron micrographs illustrating top down views of non SiC fiber cloths used as substrates for CVD growth of CNTs without a SiC coating; (A-B) glass fiber; (C-D) carbon fiber.
Figure 13A:
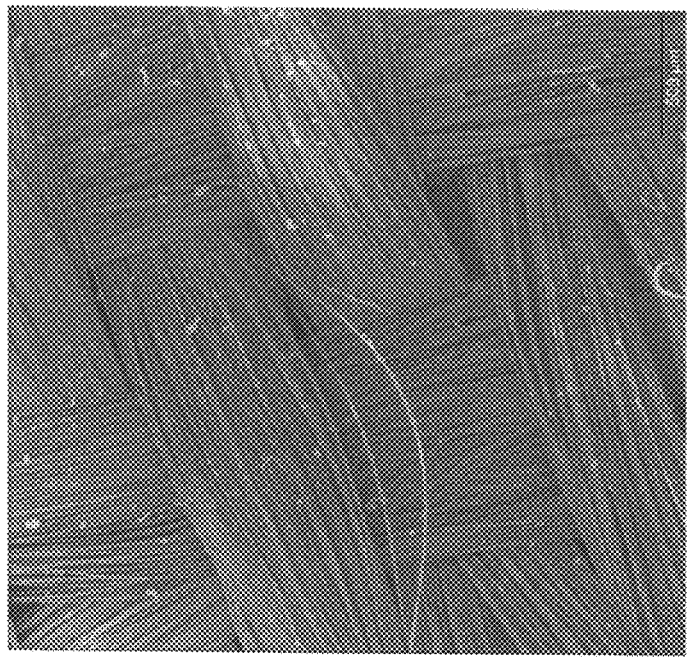
Figure 13D:
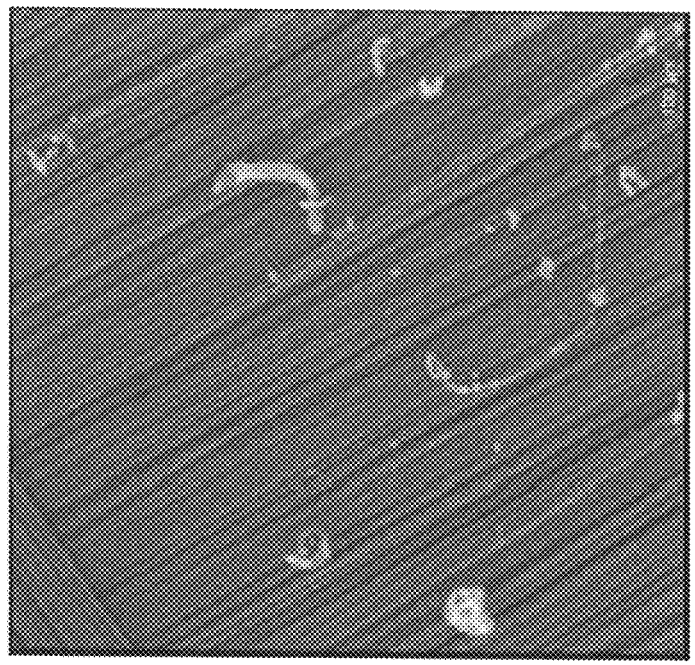
Figure 13C:
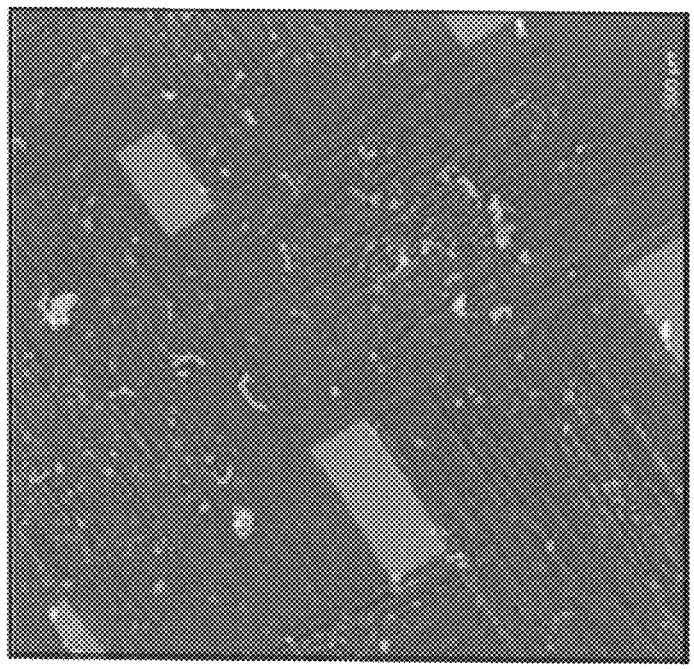
Figure 14B:
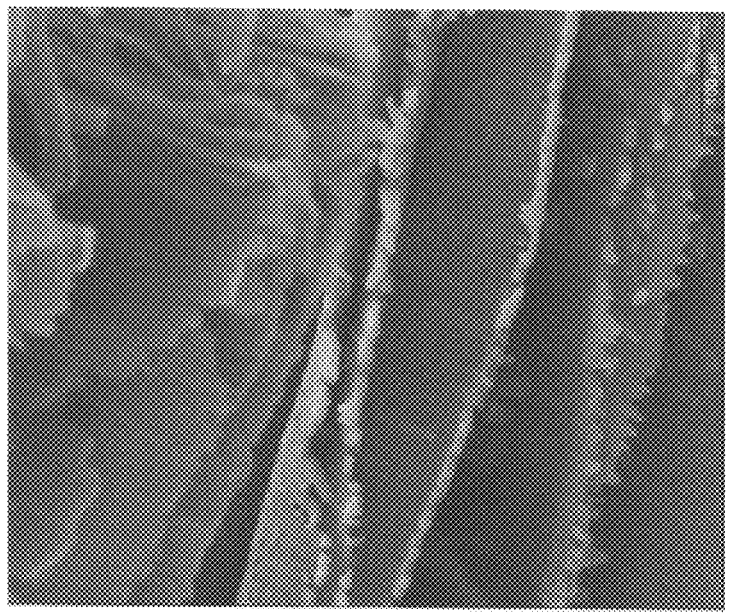
FIGS. 14A-B are scanning electron micrographs illustrating top down views of non SiC fiber cloths used as substrates for CVD growth of CNTs with a SiC coating.
Figure 14A:
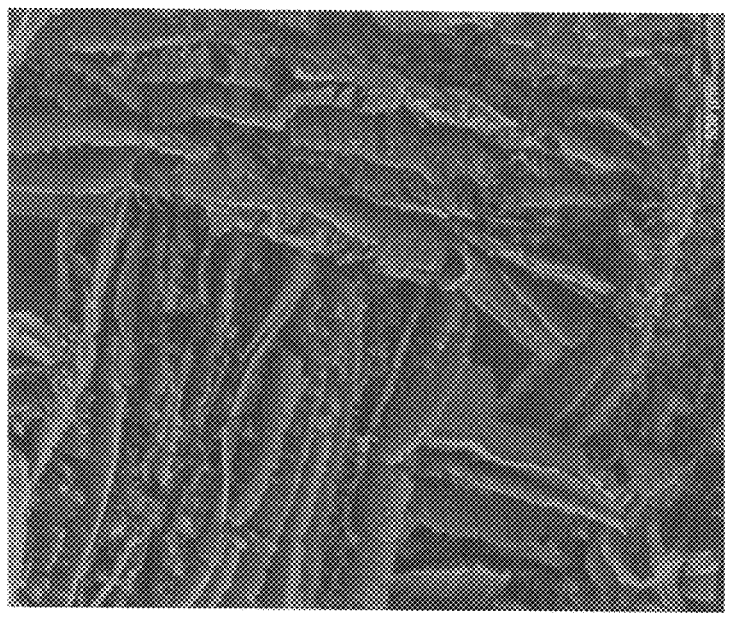

FIGS. 13A-B illustrate scanning electron micrographs of the glass fiber cloths after being subjected to the CVD CNT growth process discussed above, while FIGS. 13C-D illustrate the same for carbon fiber cloths. Examining the fiber cloths at both low magnification (FIG. 13A, C) and higher magnification (FIGS. 13B, D), the bare fiber cloth is present, with substantially no nanotube growth observed. In contrast, the coated carbon fibers demonstrate significant CNT growth, as illustrated in the top down micrograph of FIG. 14A. Similar to the CNTs grown upon SiC fibers, the CNTs grown on the SiC coated carbon fibers exhibit nanotubes which substantially cover the surface of the fiber cloth, approximately uniformly, giving the fiber cloth a coarse appearance. As further illustrated in the higher magnification top-down view of FIG. 14B, the CNTs are similarly aligned approximately perpendicular to the plane of the 2-D woven fabric. These results indicate that SiC coated non-SiC fiber cloths may be used in place of SiC fiber cloths in 3-D nanocomposites, as discussed above.

Further details regarding the embodiments provided herein are described in Veedu et al., "Multifunctional composites using reinforced laminae with carbon-nanotube forests," *Nature Materials*, Vol. 5, June 2006, the entirety of which is hereby incorporated by reference.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A three-dimensionally reinforced composite laminate, comprising:
   a matrix material; and
   a plurality of reinforcement lamina positioned substantially within the matrix, each reinforcement lamina comprising a 2-D woven fiber cloth and carbon nanotubes grown on the fibers of the woven fiber cloth, the carbon nanotubes extending approximately perpendicular to a surface defined by the woven fiber cloth and,
   the laminate further comprising at least two adjacent reinforcement lamina in which carbon nanotubes of adjacent lamina are mechanically interlocked with each other.

2. The composite laminate of claim 1, wherein the matrix comprises a high temperature epoxy based on diglycidyl ether of bisphenol A and alkylglycidyl ether, a ceramic based on a pre ceramic polymer, or a polyester.

3. The composite laminate of claim 1, further comprising nanoparticles or carbon nanotubes dispersed within the matrix.

4. The composite laminate of claim 1, wherein the 2-D fiber cloth has a plain-weave geometry.

5. The composite laminate of claim 1, wherein the 2-D fiber cloth comprises SiC fibers, carbon fibers, or glass fibers.

6. The composite laminate of claim 1, wherein the 2-D fiber cloth comprises at least one fiber having a coating of SiC.

7. The composite laminate of claim 1, wherein the carbon nanotubes provide improvement in at least one of interlaminar fracture toughness, hardness, mechanical damping, thermal conductivity, or electrical conductivity over comparable two-dimensionally reinforced composites.

8. The composite laminate of claim 1, wherein at least a portion of the carbon nanotubes are multi-wall carbon nanotubes.

9. A fabric reinforcement, comprising:
   a woven fiber cloth; and
   a plurality of carbon nanotubes grown on the woven fiber cloth, the nanotubes extending approximately perpendicular to a surface defined by the woven fiber cloth,
   the reinforcement further comprising a plurality of woven fiber cloths with carbon nanotubes grown on the woven fiber cloths, wherein the nanotubes extend approximately perpendicular to the woven fiber cloths, at least some nanotubes from adjacent fiber cloths being mechanically interlocked with each other.

10. The fabric reinforcement of claim 9, wherein the woven fiber cloth comprises SiC fibers, glass fibers, or carbon fibers.

11. The fabric reinforcement of claim 10, wherein the woven fiber cloth comprises SiC fibers.

12. The fabric reinforcement of claim 9, wherein the woven fiber cloth comprises at least one fiber coated with SiC.

13. A method of fabricating a three-dimensionally reinforced composite laminate, comprising:
   providing a two-dimensional woven fiber cloth;
   growing carbon nanotubes on a surface of the woven fiber cloth so as to form a three-dimensional fiber preform, wherein the carbon nanotubes are aligned substantially perpendicular to the surface of the fiber cloth;
   substantially infiltrating the three-dimensional fiber preform with a matrix material to form a three-dimensional composite lamina;
   assembling a plurality of three-dimensional composite laminae such that the nanotubes are substantially positioned between the laminae;
   curing the assembled laminae.

14. The method of claim 13, wherein the woven fiber cloth comprises SiC, C, or glass-fiber cloths.

15. The method of claim 13, wherein the carbon nanotubes are grown by chemical vapor deposition of a nanotube precursor solution on the surface of the woven fiber cloth.

16. The method of claim 15, wherein the precursor solution comprises a solution of at least ferrocene and xylene.

17. The method of claim 13, wherein carbon nanotubes are grown on both sides of the woven fiber cloth.

18. The method of claim 13, wherein the carbon nanolubes of adjacent laminae are substantially mechanically interlocked.

19. The method of claim 13, wherein the matrix comprises a high temperature epoxy based on diglycidyl ether of bisphenol A and alkylglycidyl ether, a ceramic based on a pre ceramic polymer, or polyester.

20. The method of claim 13, where the laminae are assembled by a hand lay-up or resin transfer molding.

* * * * *